US008279502B2

(12) United States Patent
Tsukahara

(10) Patent No.: US 8,279,502 B2
(45) Date of Patent: Oct. 2, 2012

(54) IMAGE READING APPARATUS AND IMAGE FORMING APPARATUS

(75) Inventor: Hajime Tsukahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/253,708

(22) Filed: Oct. 5, 2011

(65) Prior Publication Data

US 2012/0026550 A1 Feb. 2, 2012

Related U.S. Application Data

(62) Division of application No. 12/046,794, filed on Mar. 12, 2008.

(30) Foreign Application Priority Data

Mar. 19, 2007 (JP) ................................ 2007-070304

(51) Int. Cl.
*H04N 1/04* (2006.01)

(52) U.S. Cl. ......... 358/475; 358/484; 358/461; 358/406

(58) Field of Classification Search .................. 358/475, 358/484, 461, 474, 406, 509, 505; 382/274
See application file for complete search history.

(56) References Cited

U.S. PATENT DOCUMENTS

| | | | | |
|---|---|---|---|---|
| 4,760,464 A * | 7/1988 | Sakano | ......................... | 358/461 |
| 5,499,112 A * | 3/1996 | Kawai et al. | .................. | 358/475 |
| 6,081,351 A * | 6/2000 | Tabata | .......................... | 358/475 |
| 6,268,600 B1 * | 7/2001 | Nakamura et al. | ............ | 250/216 |
| 2006/0285174 A1 * | 12/2006 | Jeon | .............................. | 358/461 |

FOREIGN PATENT DOCUMENTS

| | | |
|---|---|---|
| JP | 7-121685 | 5/1995 |
| JP | 10-290364 | 10/1998 |
| JP | 10290364 A * | 10/1998 |
| JP | 2000-39679 | 2/2000 |
| JP | 2002-84400 | 3/2002 |
| JP | 2002084400 A * | 3/2002 |
| JP | 2002-330265 | 11/2002 |
| JP | 2002-368955 | 12/2002 |
| JP | 2007-235441 | 9/2007 |

OTHER PUBLICATIONS

Office Action issued Mar. 8, 2011 in Japanese Patent Application No. 2007-070304.

Office Action mailed Jan. 31, 2012, in co-pending U.S. Appl. No. 12/046,794.

* cited by examiner

*Primary Examiner* — Cheukfan Lee

(74) *Attorney, Agent, or Firm* — Oblon, Spivak, McClelland, Maier & Neustadt, L.L.P.

(57) ABSTRACT

An image reading apparatus has a plurality of emitters that emit light onto a manuscript surface in a light quantity that is the synthesized light quantity of light emitted from the plurality of emitters. In the image reading apparatus, determination on the abnormality of a reference white data level value at the time of turning on a power supply is carried out through comparison between the reference white data level value with a predetermined absolute value. A normal reference white data level value is stored in a first storing unit, while a comparison white data level value detected at the time of manuscript reading operation is stored in a second storing unit. Then, a differential between the level values stored in the first and second storing units is calculated, and an abnormality determining unit compares the differential with a predetermined threshold to detect the abnormality of an emitter.

5 Claims, 18 Drawing Sheets

IMAGE READING APPARATUS AND IMAGE FORMING APPARATUS

CROSS-REFERENCE TO RELATED APPLICATIONS

This application is a Divisional Application of, and claims the benefit of priority under 35 U.S.C. §120 from, U.S. application Ser. No. 12/046,794, filed Mar. 12, 2008, which claims the benefit of priority under 35 U.S.C. §119 from Japanese Patent Application No. 2007-070304 filed Mar. 19, 2007. The entire contents of each of the above applications are incorporated herein by reference.

BACKGROUND OF THE INVENTION

1. Field of the Invention

The present invention relates to an image reading apparatus and an image forming apparatus, and more particularly, to an image reading apparatus that has a plurality of light sources and that is preferable in use for an image scanner, digital copier, facsimile, etc., and an image forming apparatus having the image reading apparatus.

2. Description of the Related Art

These years, an image reading apparatus capable of faster processing poses a problem of ensuring a fine SN (Signal-to-Noise ratio) of a read image. To ensure a fine SN, a light quantity at a manuscript (original document) surface must be increased. A conventional image reading apparatus having one light source, however, may be incapable of obtaining a desired light quantity because of limitations related to drive current, heat generation, etc. Hence an image reading apparatus equipped with a plurality of light sources has been suggested. An image forming apparatus having a plurality of light sources, however, shows a high possibility of the occurrence of light source abnormality, which raises a concern that a light source's being off due to the occurrence of abnormality leads to an inferior SN and the malfunction of an image processing circuit caused by the inferior SN.

Conventionally, such an abnormality as a light source's being off is detected by finding that the light source's output level is lower than a predetermined threshold level when the light source is activated. An image reading apparatus having one light source can detect a light source's being on and off relatively easily. An image forming apparatus having a plurality of light sources, on the other hand, has difficulty in detecting an abnormality due to a light source's being off or a decrease in light quantity.

A technique enabling detection of light source abnormality in an image reading apparatus having a plurality of light sources has been suggested. For example, Japanese Patent Application Laid-Open No. 2000-39679, etc., discloses such a known technique. According to this conventional technique, reference white levels are detected at a plurality of positions on a main scanning line to calculate the average of the reference white levels, and the abnormality of a light source is detected from the ratio of the white levels detected at a plurality of spots. This conventional technique, however, has a disadvantage that the abnormality cannot be detected from the ratio of white levels detected at the plurality of spots when the white level across the entire main scanning line deteriorates uniformly.

Another known conventional technique is described in Japanese Patent Application Laid-Open No. 2002-368955, etc. According to this conventional technique, the peak value of reference white levels on the main scanning line is detected and the light quantity of the light sources is adjusted so that the peak value becomes identical with a target value, then a light source is determined to be abnormal when the peak value cannot be adjusted to be identical with the target value. This conventional technique, however, accompanies the problem that abnormality detection takes much time, which makes detection for every manuscript reading operation impossible.

Offering a detection method utilizing the peak value of reference white levels, this conventional technique does not enable precise detection of emitter abnormality, because when an image reading apparatus has an illuminating system providing the synthesized light quantity of a plurality of light emitters as a manuscript surface light quality, the peak level on an end of the main scanning line hardly changes even if one of the light emitters working as light sources is not on.

As described above, according to the conventional technique, an image forming apparatus having a plurality of light sources has difficulty in detecting an abnormality due to a light source's being off or a decrease in light quantity, and is incapable of precise abnormal detection.

SUMMARY OF THE INVENTION

It is an object of the present invention to at least partially solve the problems in the conventional technology.

According to an aspect of the present invention, an image reading apparatus having a light source emitting light on a manuscript and a photoelectric conversion element detecting refection light from the manuscript to obtain an analog image signal and digitizing the analog image signal to output a digitized image signal, the image reading apparatus includes a plurality of LEDs disposed on both end sides in a main scanning direction that is a width direction of the manuscript, the lEDs serving as the light sources, a light guide synthesizing incident light from the plurality of LEDs to emit the synthesized light as a band-shaped light flux onto the manuscript, a first storing unit determining abnormality of the light source through comparison between a reference white data level value detected at a time of turning on a power supply with a predetermined first value to store a reference white data level value determined to be normal, a second storing unit storing a comparison white data level value detected at a time of manuscript reading operation, a calculating unit calculating a differential between the reference white data level value stored in the first storing unit and the comparison white data level value stored in the second storing unit, and an abnormality detecting unit detecting abnormality of the light source through comparison between the calculated differential and a predetermined second value.

According to another aspect of the present invention, an image reading apparatus having a light source emitting light on a manuscript and a photoelectric conversion element detecting refection light from the manuscript to obtain an analog image signal and digitizing the analog image signal to output a digitized image signal, the image reading apparatus includes a plurality of LEDs disposed on both end sides in a main scanning direction that is a width direction of the manuscript, the lEDs serving as the light sources, a light guide synthesizing incident light from the plurality of LEDs to emit the synthesized light as a band-shaped light flux onto the manuscript, a detecting unit detecting a white data level at a time of manuscript reading operation at each position near the light source that is on the front end side and the rear end side in the main scanning direction, and an abnormality detecting unit calculating a differential between two detected white data levels to detect abnormality of the light source from the differential.

According to still another aspect of the present invention, an image reading apparatus having a light source emitting light on a manuscript and a photoelectric conversion element detecting refection light from the manuscript to obtain an analog image signal and digitizing the analog image signal to output a digitized image signal, the image reading apparatus includes a plurality of LEDs disposed on both end sides in a main scanning direction that is a width direction of the manuscript, the lEDs serving as the light sources, a light guide synthesizing incident light from the plurality of light sources to emit the synthesized light as a band-shaped light flux onto the manuscript, a plurality of first storing units determining abnormality of each of the plurality of light sources through comparison between each reference white data level value detected by switching on the light sources one by one with a predetermined first value and storing a reference white data level value determined to be normal for each of the light sources at a time of turning on a power supply, a second storing unit storing each comparison white data level value detected by switching on the light sources one by one for each of the light sources at a time of manuscript reading operation, a calculating unit calculating a differential for each of the light sources between the reference white data level value for each of the light sources that is stored in the first storing unit and the comparison reference white data level value for each of the light sources that is stored in the second storing unit, and an abnormality detecting unit detecting abnormality of each of the light sources through comparison between the calculated differential for each of the light sources with a predetermined second value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image reading apparatus of the present invention will now be described in detail with reference to the drawings.

Figure 1:
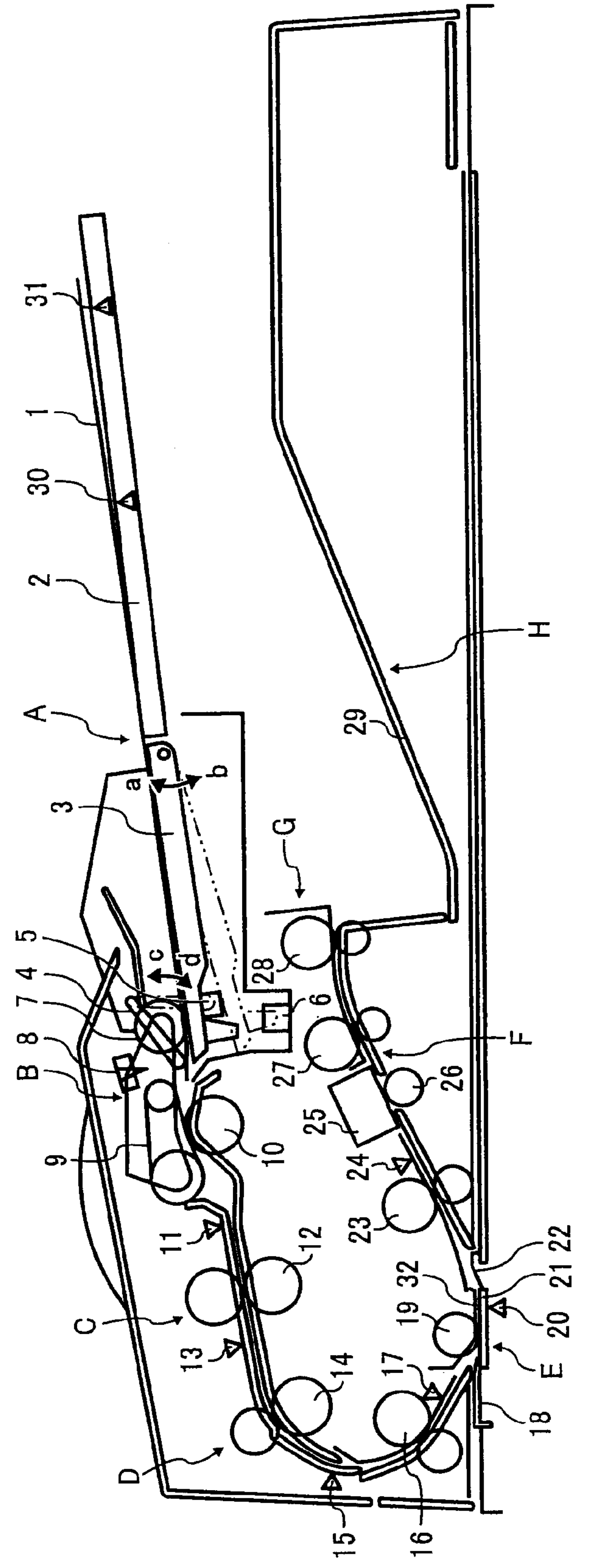
FIG. 1 is a sectional view of the basic configuration of a manuscript processor (ADF) provided as an image reading apparatus to which the present invention applies.

FIG. 1 is a sectional view of the basic configuration of a manuscript processor (ADF: Automatic Document Feeder) provided as the image reading apparatus to which the present invention applies, and FIG. 2 is a block diagram of the functional configuration of the image reading apparatus.

The image reading apparatus shown in FIG. 1 transfers a to-be-read manuscript (original document) to a stationary reading unit, and reads an image while the manuscript is transferred at given speed. The image reading apparatus includes a manuscript setting unit A that sets a sheaf of to-be-read manuscripts, a separate feeding unit B that separates one manuscript from the set sheaf of manuscripts to feed the manuscripts one by one, a resist unit C that carries out primary bumping and adjustment of a leading edge of the fed manuscript and that pulls out the adjusted manuscript to transfer it, a turn unit D that turns the manuscript to transfer the manuscript with its manuscript face directed to the reading side (downward), a first reading transfer unit E that reads an image on the front face of the manuscript from below a contact glass, a second reading transfer unit that reads an image on the back face of the manuscript following reading of the image on the front face, a paper ejecting unit G that ejects the manuscript through with reading of both faces out of the image reading apparatus, and a stack unit H that stacks and holds the manuscript through with reading.

Figure 2:
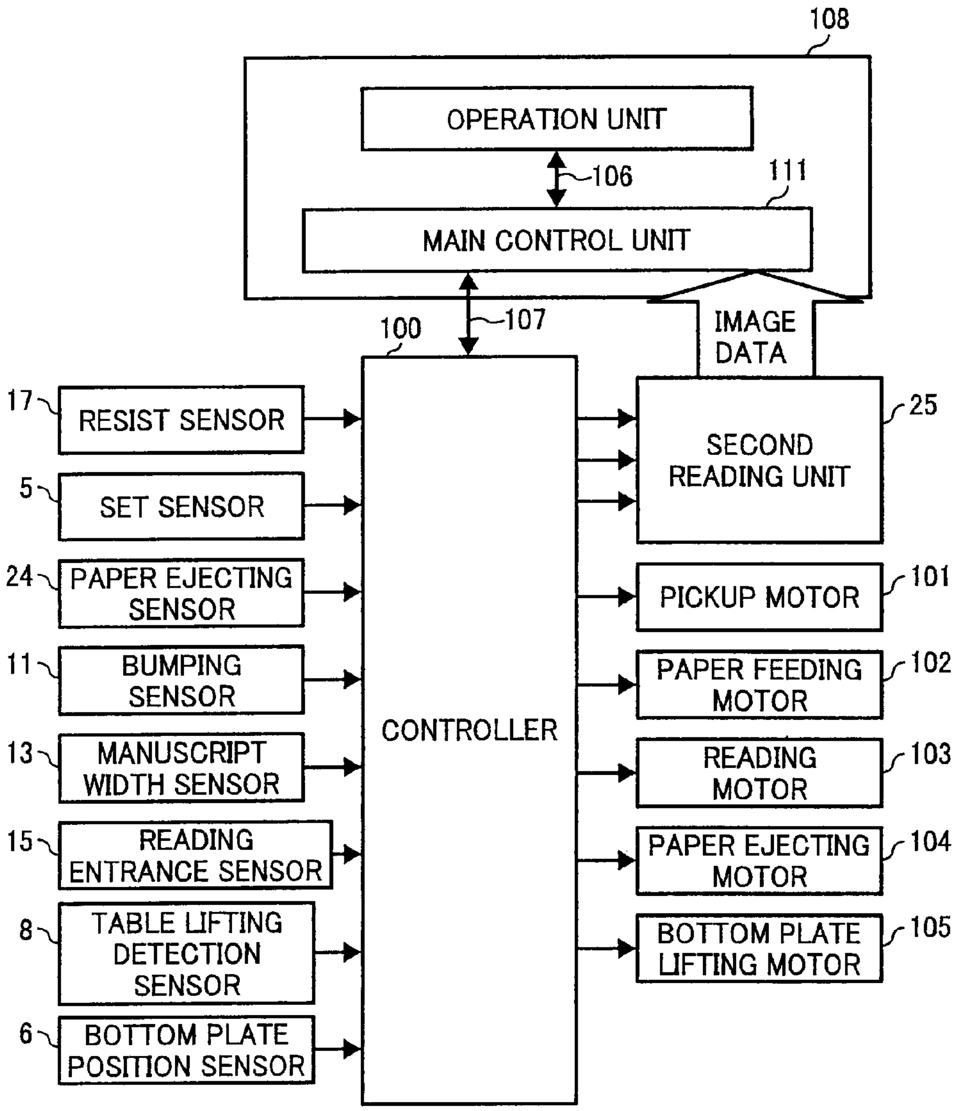
FIG. 2 is a block diagram of the functional configuration of the image reading apparatus.

The image reading apparatus, as shown in FIG. 2, also includes drive units 101 to 105 consisting of various motors that drive component units for such manuscript transfer operation as described above, various sensors disposed on such transfer paths as described above, and a controller 100 serving as an ADF control unit that controls a series of operations by controlling the drive units 101 to 105 in response to signals receiving from the sensors. The controller 100 is connected to a main control unit 111 of an image forming apparatus via an interface (I/F) 107. The main control unit 111 is connected to an operation unit 108. The controller 100 is connected also to a second reading unit 25 to control reading operation. Image data on the manuscript's back face read by the second reading unit 25 is sent to the main control unit 111. A first reading unit that reads the image on the manuscript's front face, the first reading unit being not shown in FIGS. 1 and 2, is also connected to the controller 100 to be under its control.

In the above image reading apparatus, a manuscript sheaf 1 to be read is set with the manuscript's front faces directed upward on a manuscript table 2 including a movable manuscript table 3, where the manuscript sheaf 1 is positioned by a side guide (not shown) to be perpendicular widthwise to a transfer direction. The set position of the manuscript is detected by a set filler 4 and a set sensor 5, and information of the set position is transmitted to the main control unit 111 via the controller 100 and the I/F 107.

A manuscript length detection sensor 30 or 31 (reflective sensor, or actuator-type sensor capable of detecting even a single manuscript) disposed on the manuscript table surface determines the approximate length of the manuscript in the transfer direction. This sensor is provided as a sensor capable of determining at least the length or width of a manuscript having the same size as the manuscript on the table.

The movable manuscript table 3 can be moved vertically in directions a and b arrowed in FIG. 1 by a bottom plate lifting motor 105. When setting of the manuscript is detected by the set filler 4 and the set sensor 5, the bottom plate lifting motor 105 is rotated clockwise, which causes the movable manuscript table 3 to move up to leave the location of a bottom plate position sensor 6 to bring the uppermost face of the manuscript sheaf in contact with a pickup roller 7.

The pickup roller 7 is rotated by a pickup motor 101 via a cam mechanism in directions c and d arrowed in FIG. 1, and is also pushed up in the direction c by the top face of the manuscript on the movable manuscript table 3 as the movable manuscript table 3 moves upward, at which the upper limit of ascending of the pickup roller 7 is detected by a table lifting detection sensor 8.

Afterward, when a print key, etc., on the operation unit 108 is pressed, the main control unit 111 transmits a manuscript feeding signal to the controller 100 via the I/F 107. As a result, a paper feeding motor 102 rotates clockwise to rotate the pickup roller 7, which picks up several manuscripts (ideally, one manuscript). The pickup roller 7 rotates in the direction in which the uppermost manuscript is transferred to a paper feeding inlet.

A paper feeding belt 9 is driven in a paper feeding direction by the clockwise rotation of the paper feeding motor 102, while a reverse roller 10 is rotated in reverse to the paper feeding direction by the clockwise rotation of the paper feeding motor 102 to separate the uppermost manuscript from the manuscript underneath thereof, thus feeding only the uppermost manuscript. More specifically, when being in direct contact or indirect contact across one manuscript with the paper feeding belt 9 under a given pressure, the reverse roller 10 is engaged with the paper feeding belt 9 due to the given pressure to rotate counterclockwise the reverse roller 10 as caught-up rotation. The reverse roller 10 is set up so that its caught-up rotation force is lower than the torque of a torque limiter. As a result, when two or more manuscripts enter a gap between the paper feeding belt 9 and the reverse roller 10, the reverse roller 10 rotates in the clockwise direction, which is the original drive direction of the reverse roller 10, to push back a redundant manuscript to prevent transfer of overlapping manuscripts.

One manuscript separated from the manuscript sheaf by the operation of the paper feeding belt 9 and reverse roller 10 is further transferred by the paper feeding belt 9 to a bumping sensor 11, which detects the front end of the manuscript. The manuscript then advances further to bump into pullout rollers 12 in stoppage. Subsequently, the manuscript is sent ahead by a prescribed distance from the position detected by the bumping sensor 11 to end up in a state of being pressed against the pullout rollers 12 to have a given extent of a flexure. As the manuscript is in this state, the controller 100 controls the paper feeding motor 102 to stop it, which brings the paper feeding belt 9 to a stop. At this time, the pickup motor 101 is rotated to cause the pickup roller to retreat from the manuscript top face to transfer the manuscript only by the transfer force of the paper feeding belt 9. This causes the manuscript front end to come into a nip between a pair of upper and lower rollers composing the pullout rollers 12, where the direction of the front end is adjusted (skew correction function).

The pullout rollers 12 has the above skew correction function, and transfers the manuscript having its skew corrected after separation to intermediate rollers 14. The pullout rollers 12 are driven by the counterclockwise rotation of the paper feeding motor 102. As the paper feeding motor 102 rotates counterclockwise, the pullout rollers 12 and the intermediate rollers 14 are driven but the pickup roller 7 and the paper feeding belt 9 are not driven.

A plurality of manuscript width sensors 13 are arranged in the direction of depth of FIG. 1, i.e., the width direction of the manuscript, detecting the size of the manuscript in the width direction perpendicular to the transfer direction as the manuscript is transferred by the pullout rollers 12. The length of the manuscript in the transfer direction is detected by motor pluses that are generated as the bumping sensor 11 reads the front and rear ends of the manuscript.

When the manuscript is transferred from the resist unit C to the turn unit D through driving of the pullout rollers 12 and the intermediate rollers 14, a transfer speed at the resist unit C is detected to determine a transfer speed at the turn unit D to be higher than a transfer speed at the transfer unit E. This reduces a process time required for sending the manuscript to the reading unit.

When the manuscript further advances to allow a reading entrance sensor 15 to detect the manuscript front end, the deceleration of the manuscript starts to bring a manuscript transfer speed equal to a reading transfer speed before the manuscript front end comes into a nip between a pair of upper and lower rollers composing reading entrance rollers 16. At the same time, a reading motor 103 is rotated clockwise to drive the reading entrance rollers 16, reading exit rollers 23, and CIS exit rollers 27.

When a resist sensor 17 detects the manuscript front end, the manuscript is decelerated over a given transfer distance, and is stopped temporarily at the this side of a reading position 20, at which time a resist stoppage signal is transmitted to the main control unit 111 via the controller 100 and the I/F 107. Subsequently, when the controller 100 receives a reading start signal from the main control unit 111, the controller 100 transfers the manuscript, which is in resist stoppage, under acceleration control to raise the speed of the manuscript up to a given transfer speed by the time of the manuscript front end's reaching the reading position 20.

In timing of the manuscript front end's reaching the reading unit, the timing being detected by the pulse count of the reading motor, a gate signal indicating a subscanning direction effective image area on a first face (manuscript front face) is transmitted from the controller 100 to the main control unit 111 until the manuscript rear end (trailing edge) goes through the first reading unit (not shown) disposed below a contact glass 21. During transmission of the gate signal, an image on the front face of the manuscript is read by the first reading unit from below the contact glass 21. A first reading roller 19 suppresses the loosening of the manuscript from the contact glass 21 in the reading unit, and also serves as a reference white portion for obtaining shading data from the reading unit.

In a case of single-faced manuscript reading, the manuscript having passed through the reading transfer unit E is further transferred to the paper ejecting unit G through the second reading unit 25. When the manuscript front end is detected by a paper ejecting sensor 24, a paper ejecting motor 104 is rotated clockwise to rotate paper ejecting rollers 28 counterclockwise, which ejects the manuscript. At this time, based on the count of paper ejecting motor pulses given by detection of the manuscript front end by the paper ejecting sensor 24, the paper ejecting motor 104 is controlled to reduce its drive speed before the manuscript rear end comes out of a nip between a pair of upper and lower rollers composing the paper ejecting rollers 28 so that the manuscript ejected onto a paper ejecting tray 29 does not jumping out of the paper ejecting tray 29.

In a case of double-sided manuscript reading, in timing of the manuscript front end's reaching the second reading unit 25 following detection of the manuscript front end by the paper ejection sensor 24, the timing being detected by the pulse count of the reading motor, a gate signal indicating a subscanning direction effective image area on a second face (manuscript back face) is transmitted from the controller 100 to the main control unit 111 until the manuscript rear end goes through the second reading unit. During transmission of the gate signal, an image on the back face of the manuscript is read by the second reading unit 25. A second reading roller 26 suppresses the loosening of the manuscript in the second reading unit, and also serves as a reference white portion for obtaining shading data from the second reading unit.

Figure 3:
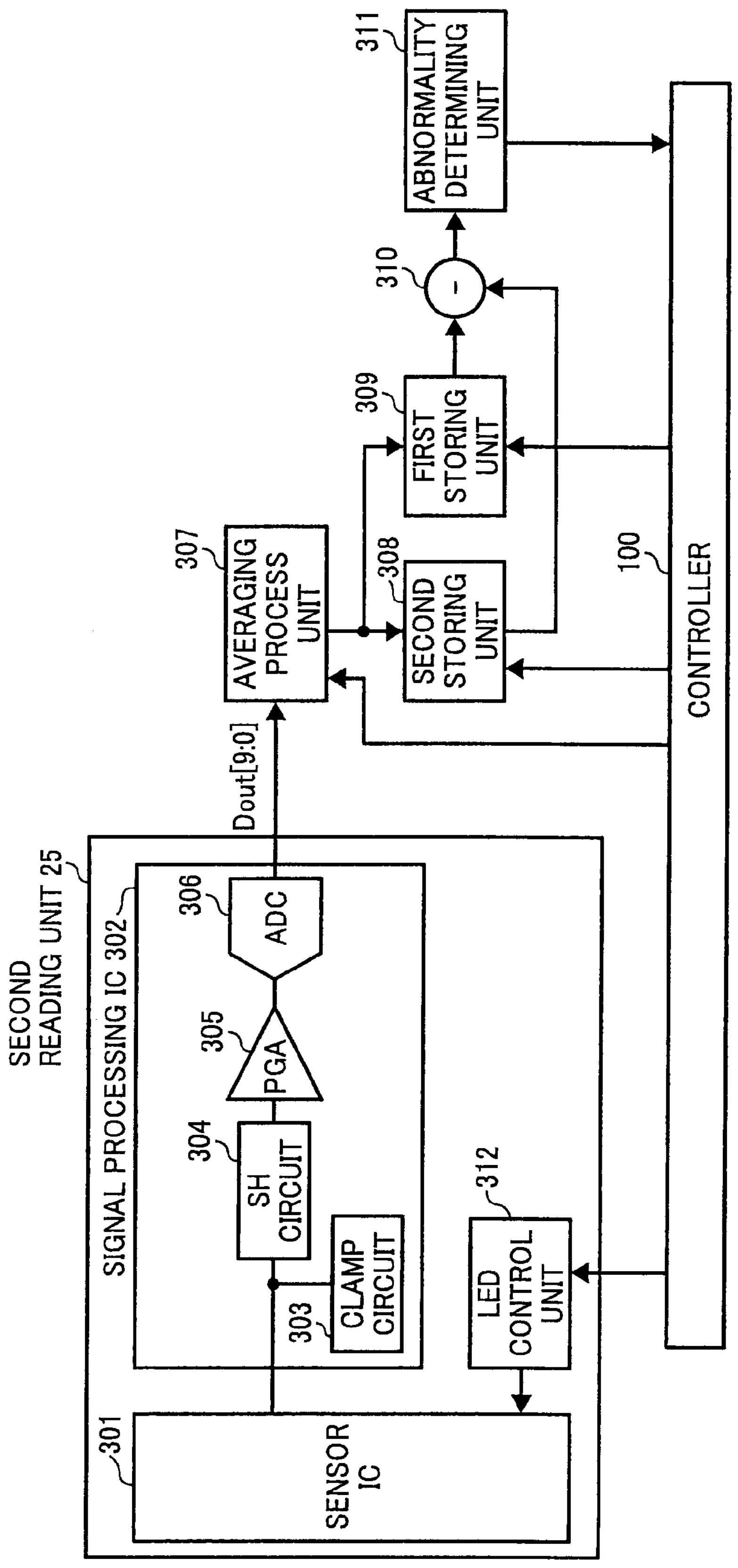
FIG. 3 is a block diagram of the circuit configuration of an image reading apparatus according to a first embodiment of the present invention.

FIG. 3 is a block diagram of a circuit configuration of the image reading apparatus according to a first embodiment of the present invention. While the circuit configuration of the image reading apparatus of FIG. 3 is centered on the second reading unit, the same configuration also applies to the first reading unit.

The image reading apparatus of FIG. 3 includes the second reading unit 25, an averaging process unit 307 that calculates a position of identification by the second reading roller 26 and an image average value in the area on digitized image data from the second reading unit 25, a first storing unit 309 that stores a reference white data level value therein, which is reference data from the averaging process unit 307, a second storing unit 308 that stores a comparison white data level value therein, which is an image average value just before image reading, a differential detector 310 that obtains a differential between two level values stored in the first and second storing units, an abnormality determining unit 311 that compares the differential from the differential detector 310 with a TH value, which is a predetermined determination reference value, to detect the abnormality of a light source in the image reading apparatus and that informs the controller 100 of abnormality when detecting the abnormality, and the controller 100 that control the whole of the above functional units. The first and second storing units should preferably be composed of nonvolatile memories, etc.

The second reading unit 25 has a sensor IC 301 which includes a photoelectric conversion element that is driven by a timing generation circuit (not shown) to output an analog image signal obtained by converting reflected right from the manuscript into an electric signal, a signal processing IC 302 that converts the analog image signal from the sensor IC 301 into a digital image signal to output the digital image signal to the averaging process unit 307, and an LED control unit 312 that controls the light quantity of LEDs that are the light source of the image reading apparatus.

The signal processing IC 302 is composed of a clamp circuit 303, a sample-hold circuit 304, a programmable gain amplifier 305, and an AD converter 306. The analog image signal from the sensor IC 301 is clamped to the internal reference potential of the signal processing IC 302 by the clamp circuit 303. The sample-hold circuit 304 samples the clamped analog image signal with a sample pulse, which is one of signal processing IC drive signals (not shown), to turn the analog image signal into a continuous analog image signal by keeping the level of the signal intact. Subsequently, this continuous analog image signal is amplified by the programmable gain amplifier 305 at a given amplification rate, and then is converted into digital image data by the AD converter 306. The converted digital image data is output to an image processing unit (not shown) composing the image forming apparatus and to the averaging process unit 307.

Detection of light source abnormality in the image reading apparatus of FIG. 3 is carried out for every image reading operation. The detection, however, may be carried out only once when the power supply of the image forming apparatus is turned on, or carried out once at the start of operation when a plurality of manuscripts are set on the ADF.

Figure 4A:
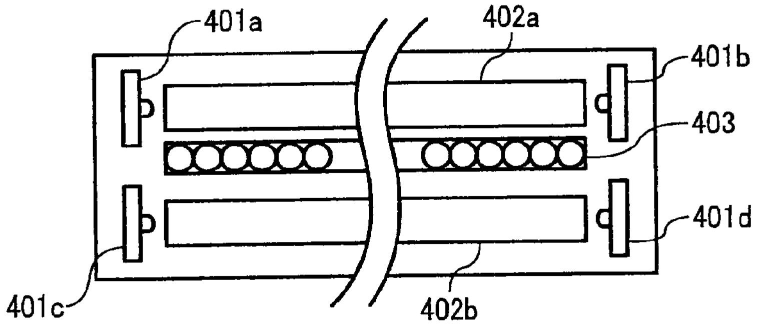
FIGS. 4A and 4B depict configurative examples in component arrangement of light sources in a second reading unit and a sensor array portion.
Figure 4B:
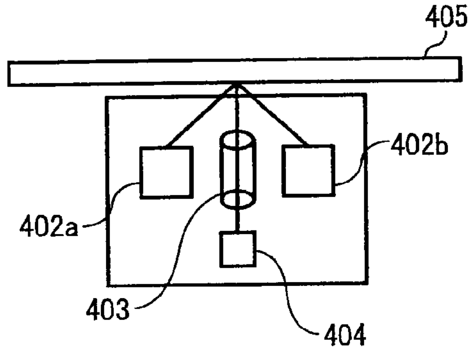

FIGS. 4A and 4B depict configurative examples in component arrangement of light sources in the second reading unit 25 and a sensor array. Light sources emitting light for manuscript reading are provided as a plurality of LEDs disposed on both end sides in the width direction of the manuscript (perpendicular to the manuscript transfer direction, i.e., main scanning direction). In a plan view of FIG. 4A, LED circuit boards 401*a* and 401*b* are disposed on one of both end sides, while LED circuit boards 401*b* and 401*d* are disposed on the other of both end ends, and each circuit board carries a LED serving as a light source. Light guides 402*a* and 402*b*, which guide light flux onto the manuscript face, are placed between the LED circuit boards 401*a* and 401*b* and between the circuit boards 401*c* and 401*d*, respectively.

As shown in a side view of FIG. 4B, light emitted from the LEDs on the LED circuit boards 401*a* to 401*d* is reflected and diffused inside the light guides 402*a* and 402*b*, from which light comes out as a band-shaped light flux having uniform illuminance against a manuscript 405. An SLA (Selfoc® Lens Array) 403 is disposed to face the band-shaped portion of the manuscript 405 that is exposed to the light flux, which the SLA 403 is a lens that leads reflection light from an image on the manuscript 405 to an equal-magnification sensor array 404 (sensor IC 301 shown in FIG. 3). Thus, the reflected light from the image on the manuscript 405 passes through the SLA 403 and is received by the equal-magnification sensor array 404, where the intensity of the reflected light is converted into electric signal.

In the case of FIGS. 4A and 4B, two LEDs serving as light sources are disposed on each of both end sides to provide four LEDs in total. One LED, however, may be disposed on each of both end sides to provide two LEDs in total. In this case, one light guide is provided and one LED is disposed on each of both sides of the light guide, or two light guides are provided and one LED is disposed on one side or the other side of each light guide so that two LEDs are opposite to each other while a light reflector, such as a mirror, is placed on one or the other end of each light guide where the LED is not disposed. Both patterns of arrangement are applicable when the LEDs are capable of emitting the light flux having uniform illuminance against the manuscript 405.

An example of illuminance distribution in the main scanning direction by the image reading apparatus of the present invention having a plurality of light sources will then be described.

Figure 5:
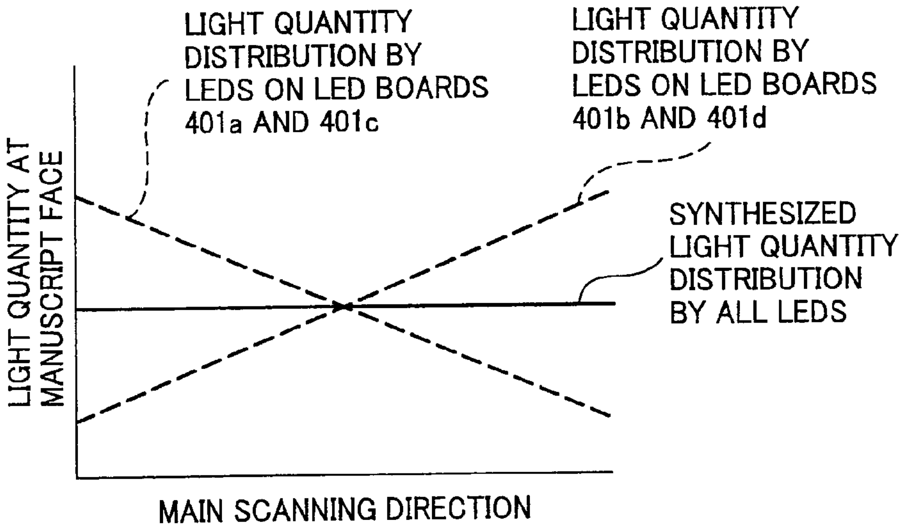
FIG. 5 depicts an example of illuminance distribution in a main scanning direction that results when LEDs on a plurality of LED circuit boards shown in FIG. 4A emit light normally.

FIG. 5 depicts an example of illuminance distribution in the main scanning direction that results when the LEDs on the plurality of LED circuit boards 401*a* to 401*d* shown in FIG. 4A emit light normally. As shown in FIG. 5, the light quantity of the LEDs on the LED circuit boards 401*a* and 401*c* is dominant on the main scanning front end side, while the light quantity of the LEDs on the LED circuit boards 401*b* and 401*d* is dominant on the main scanning rear end side. Synthesization of light quantity from both sides is indicated by a continuous line that represents main scanning illuminance distribution on the manuscript face, which is shown in FIG. 5 as synthesized light distribution by all LEDs.

Figure 6:
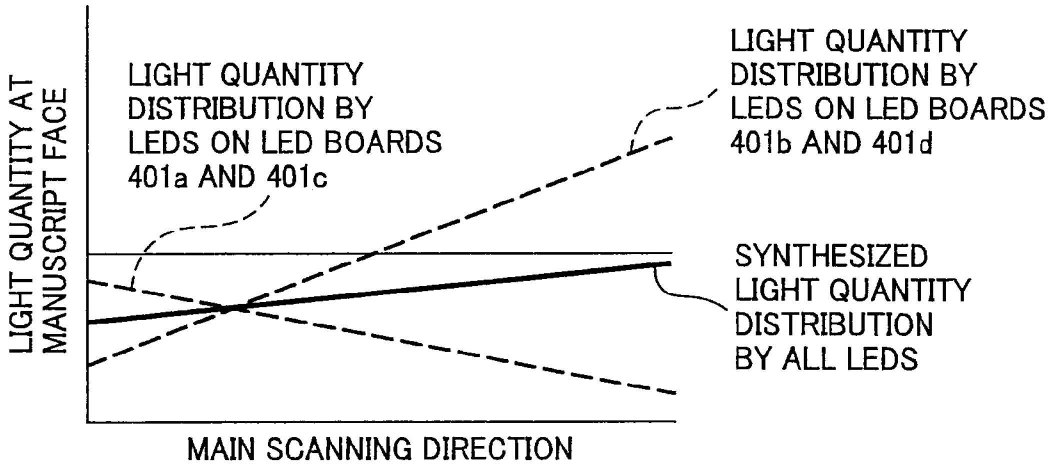
FIG. 6 depicts an example of illuminance distribution in the main scanning direction that results when the LED on the LED circuit board of FIG. 4A is off.

FIG. 6 depicts illuminance distribution in the main scanning direction that results when the LED on the LED circuit board 401*a* of FIG. 4A is off. In the case of FIG. 6, the light quantity on the main scanning front end side decreases, which prevents the synthesized light quantity distribution by all LEDs from being flat relative to the main scanning direction but has little effect on the light quantity on the rear end side. In this case, the LED's being off cannot be detected by a conventional technique for detecting the peak level of light quantity during the main scanning.

Figure 7:
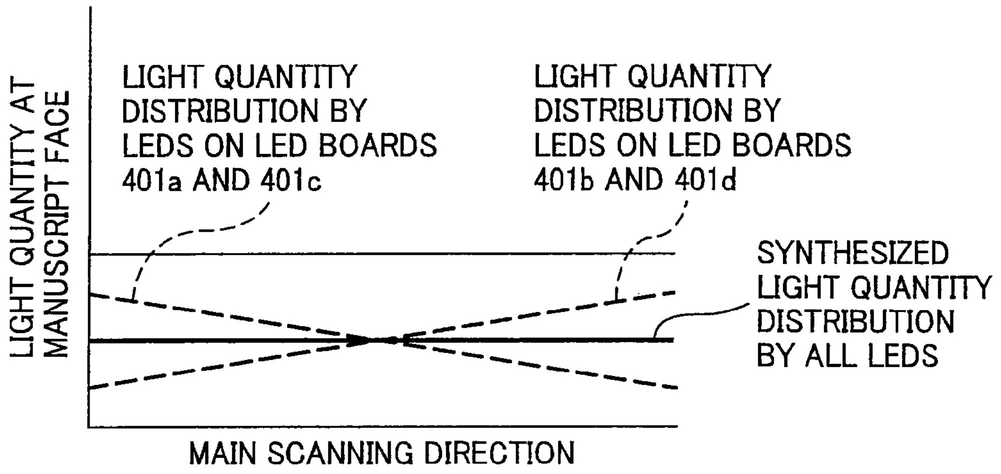
FIG. 7 depicts an example of illuminance distribution in the main scanning direction that results when the LEDs on the LED circuit boards of FIG. 4A are off.

FIG. 7 depicts an example of illuminance distribution in the main scanning direction that results when the LEDs on the LED circuit boards 401*a* and 401*b* of FIG. 4A are off. In the case of FIG. 7, the same light quantity decreases on the main scanning front end side as well as on the main scanning end side, which reduces the synthesized light quantity by all LEDs but its distribution becomes flat against the main scanning direction.

As described in FIGS. 5 to 7, the image reading apparatus having a plurality of light sources disposed on both ends in the main scanning direction generates a plurality of illuminance distribution patterns in the main scanning direction because of light source abnormality. This leads to difficulty in precisely detecting a light source's being off and a decrease in light quantity by detecting a decrease in an output level in white level detection and output distribution irregularities in the main scanning direction.

The following embodiments of the present invention facilitate detection of light source abnormality in the image reading apparatus having the plurality of light sources described with reference to FIG. 4A.

Figure 8A:
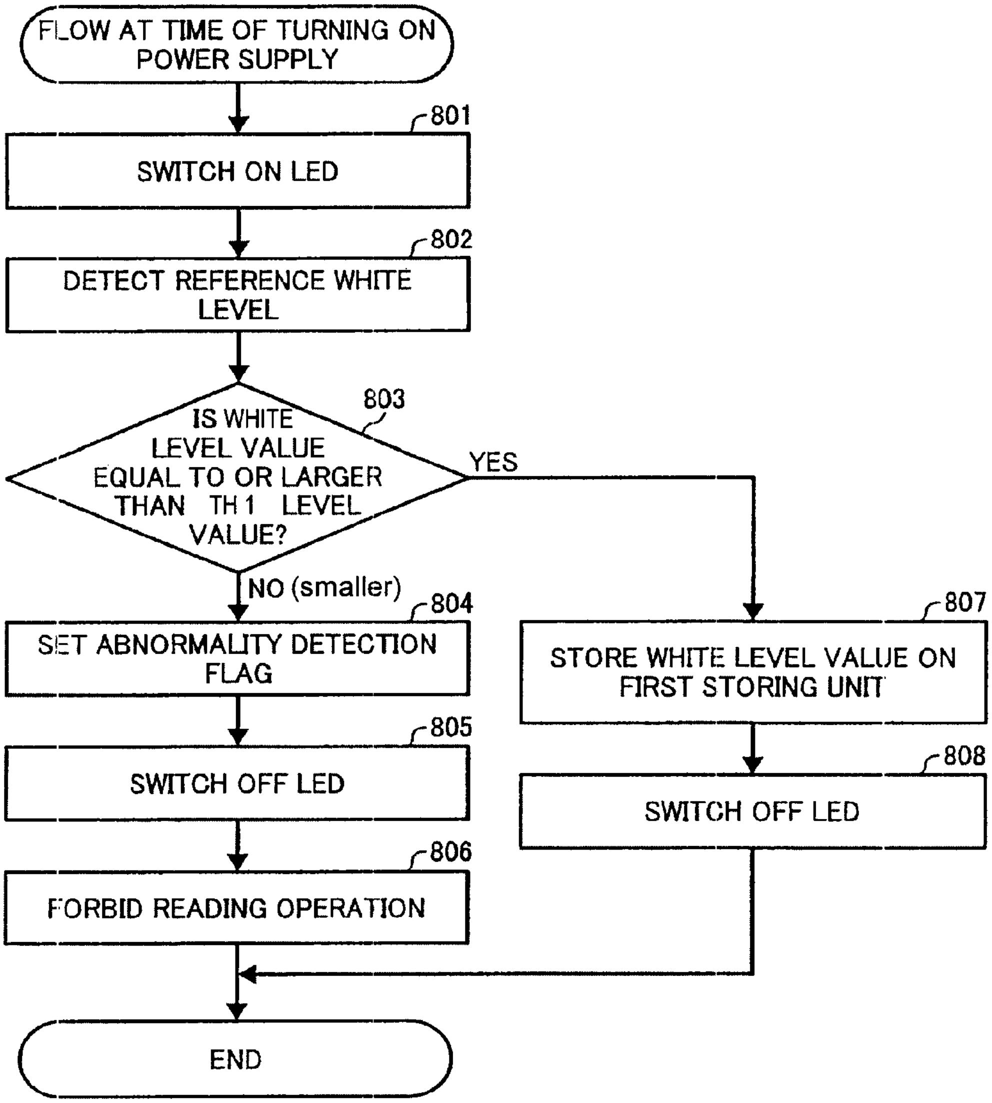
FIGS. 8A and 8B are flowcharts for explaining the control operation of the image reading apparatus according to the first embodiment.
Figure 8B:
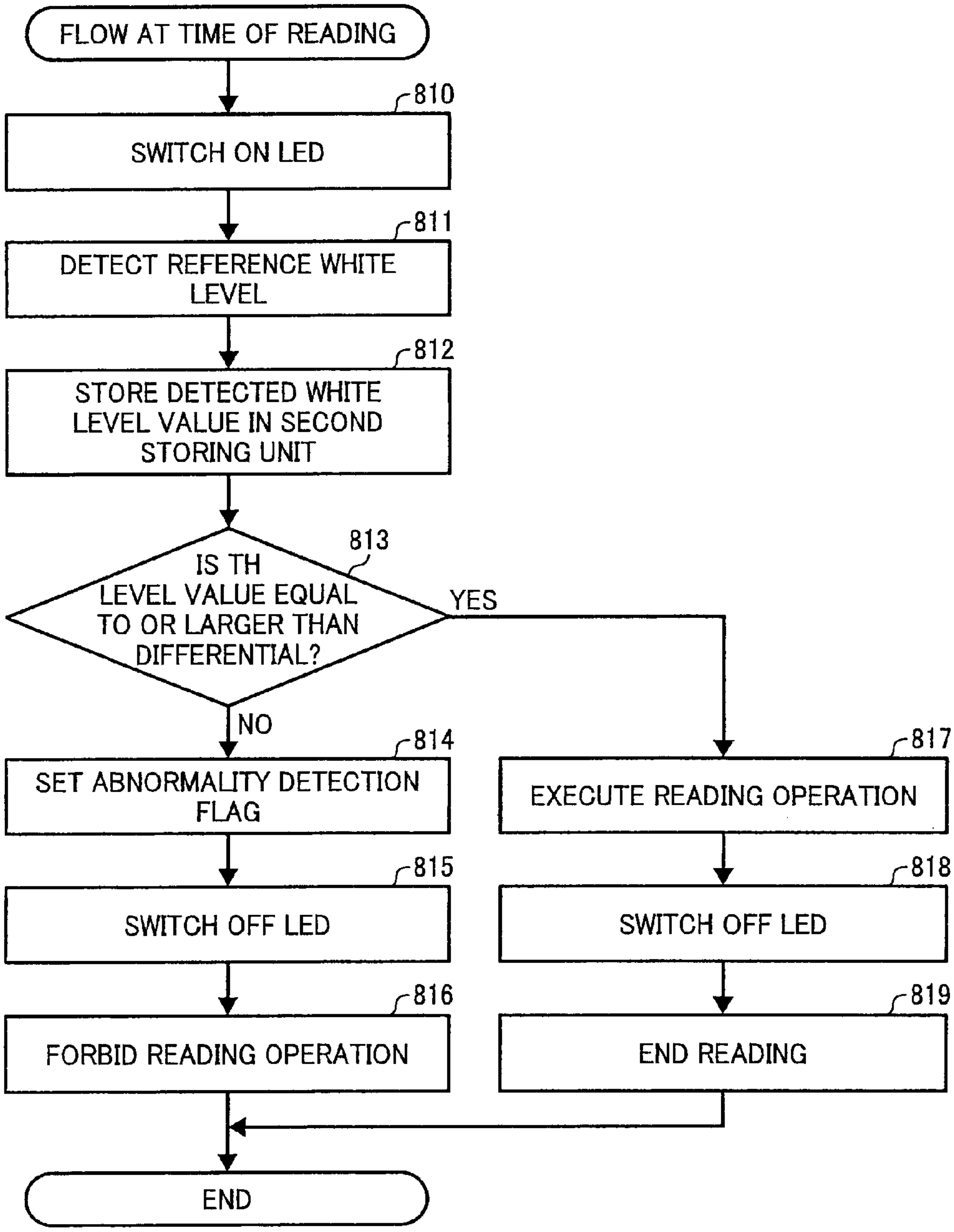

FIGS. 8A and 8B are flowcharts for explaining the control operation of the image reading apparatus of the first embodiment of the present invention. This flowchart will then be described. The control operations described here and later are all carried out by the controller 100. FIG. 8A depicts a process flow at the time of turning on the power supply, and FIG. 8B depicts a process flow at the time of reading. Both process flows as a whole will be described in succession.

When the power supply of the image forming apparatus having the image reading apparatus is turned on, the above described LEDs are switched on, and the level of the reference white portion of the second reading roller 26 serving also as the reference white portion is detected to obtain reference white data for abnormality detection (steps 801 and 802).

Then, the absolute value of the level of the obtained reference white data is compared with a predetermined TH 1 level value stored in a nonvolatile memory, etc., (TH 1 level value is determined based on a level that can be obtained as a result of normal switching on of all LEDs), and whether the obtained reference white data level value is smaller than the TH 1 level value is determined (step 803).

When the obtained reference white data level value is smaller than the TH 1 level value in the determination at step 803, a determination is made that at least one of the LEDs serving as light sources is not on, or, the light quantity of some of the lEDs decreases significantly. Following this determination, an abnormality detection flag is set, and the LEDs are controlled to be switched off to forbid manuscript reading operation to follow (steps 804 to 806).

When the obtained reference white data level value is equal to or larger than the TH 1 level value in the determination at step 803, a determination is made that the detected reference white level value is normal. Following this determination, the detected reference white level value is stored in the first storing unit 309, and the LEDs are controlled to be switched off to get into a stand-by state (steps 807 and 808).

When manuscript reading operation is started after the transition to the stand-by state following determination of normal reference white level at the time of turning on the power supply, to carry out detection of light source abnormality before image reading operation, the LEDs are switched on, and the level of the reference white portion of the second reading roller 26 serving also as the reference white portion is detected in the same process at the time of turning on the power supply. The detected level is stored as a comparison white level value in the second storing unit 308 (steps 810 to 812).

Subsequently, a differential between the comparison white level value stored in the second storing unit 308 at step 812 and the reference white level value stored in the first storing unit 309 at the time of turning on the power supply is calculated. This differential is compared with the predetermined TH level value stored in the nonvolatile memory, etc., to determine on whether the TH level value exceeds the differential (step 813).

When the differential exceeds the TH level value, that is, the differential is larger than the TH level value in the determination at step 813, a determination is made that at least one of the LEDs serving as light sources has gone off or the light quantity of some of the lEDs has decreased significantly in a period between turning on of the power supply and the start of the manuscript reading. Following this determination, the abnormality detection flag is set, and the LEDs are controlled to be switched off to forbid manuscript reading operation to follow (steps 814 to 816).

When the differential does not exceed the TH level value, that is, the differential is equal to or smaller than the TH level value in the determination at step 813, a determination is made that the detected reference white level value is normal. Following this determination, manuscript reading operation is executed, and the LEDs are controlled to be switched off following the completion of reading to end the process flow normally (steps 817 to 819).

Figure 9:
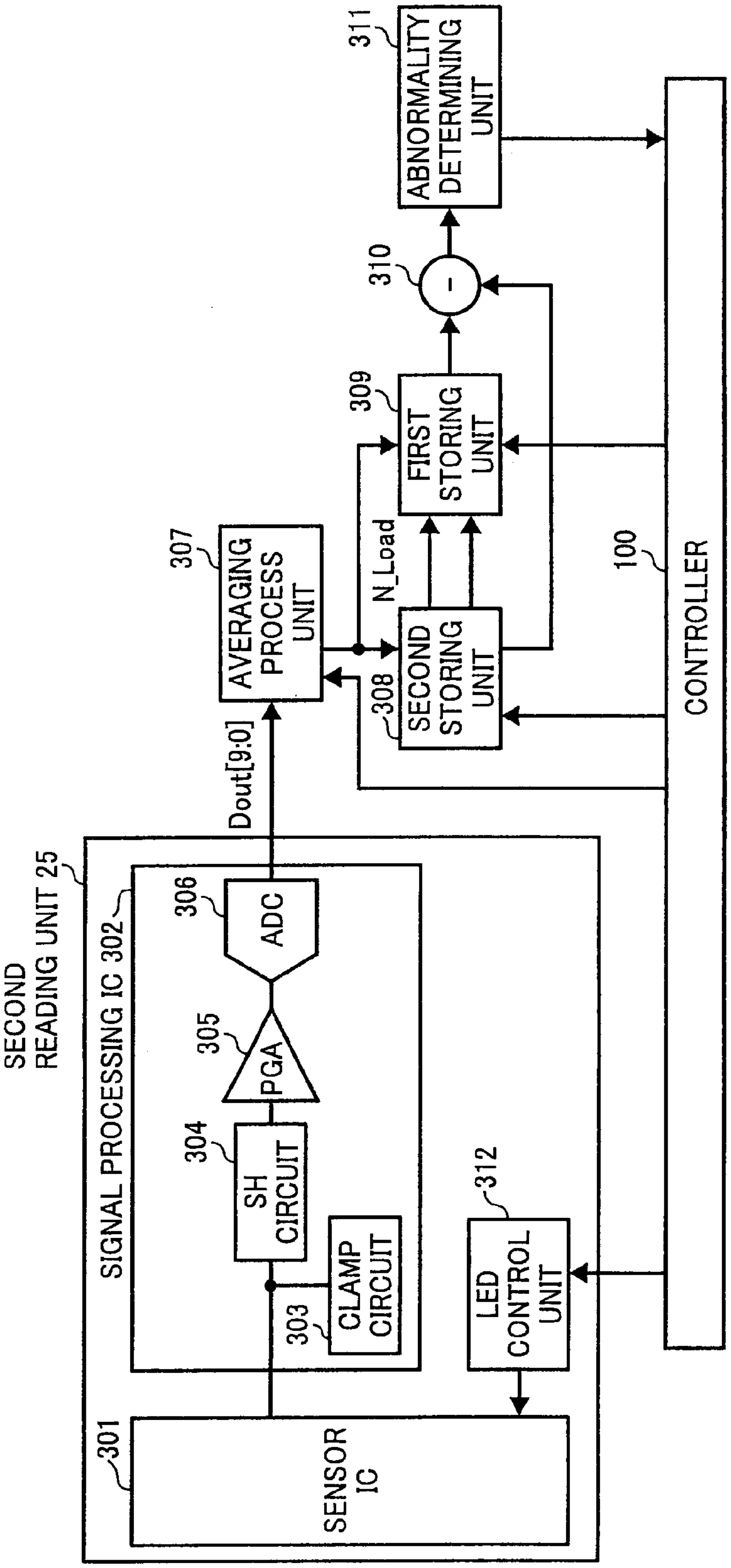
FIG. 9 is a block diagram of the circuit configuration of an image reading apparatus according to a second embodiment of the present invention.

FIG. 9 is a block diagram of the circuit configuration of an image reading apparatus according to a second embodiment of the present invention. The image reading apparatus of FIG. 9 is basically the same in configuration as the image reading apparatus of the first embodiment shown in FIG. 3. The image reading apparatus of FIG. 9 is different from that of FIG. 3 in the point that data in the second storing unit 308 can be updated as data of the first storing unit 309.

In the image reading apparatus of the second embodiment of the present invention as shown in FIG. 9, the controller 100 controls an N_Load signal after the end or start of image reading to load data stored in the second storing unit 308 into the first storing unit 309. This data value is used as a reference white level value in manuscript reading operation to follow.

Usually, the image forming apparatus shows an increase in its internal temperature caused by various process operations when the power supply is turned on or during a period from the start to the end of manuscript reading. This temperature increase affects the temperature characteristics of the LEDs, resulting in a change in the light quantity of the LEDs. In the second embodiment of the present invention, the reference white level value is updated in response to a change in the light quantity of the LEDs due to such a temperature increase to enable obtaining image data with a better SN.

Figure 10:
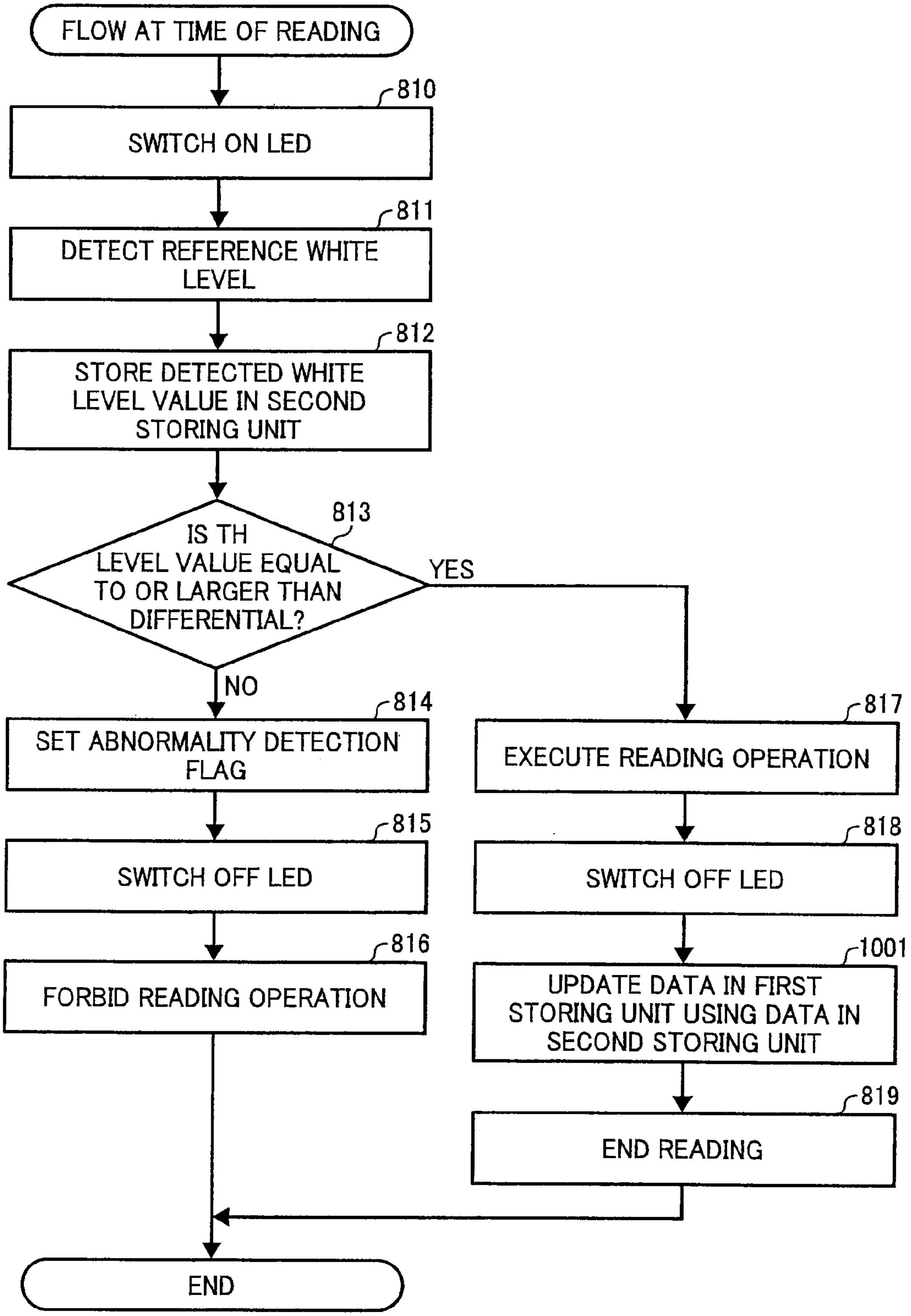
FIG. 10 is a flowchart for explaining the control operation of the image reading apparatus according to the second embodiment.

FIG. 10 is a flowchart for explaining the control operation of the image reading apparatus of the second embodiment. This flowchart will then be described. FIG. 10 depicts a process flow at the time of image reading, and the process flow at the time of turning on the power supply in the second embodiment is identical with that shown in FIG. 8A. The process flow of FIG. 10 is different from that of FIG. 8B in the point that step 1001 of transferring data in the second storing unit 308 to the first storing unit 309 to update data in the first storing unit 309 is interposed between step 818 of LED switching off control following execution of manuscript reading operation and step 819 of ending manuscript reading.

Figure 11:
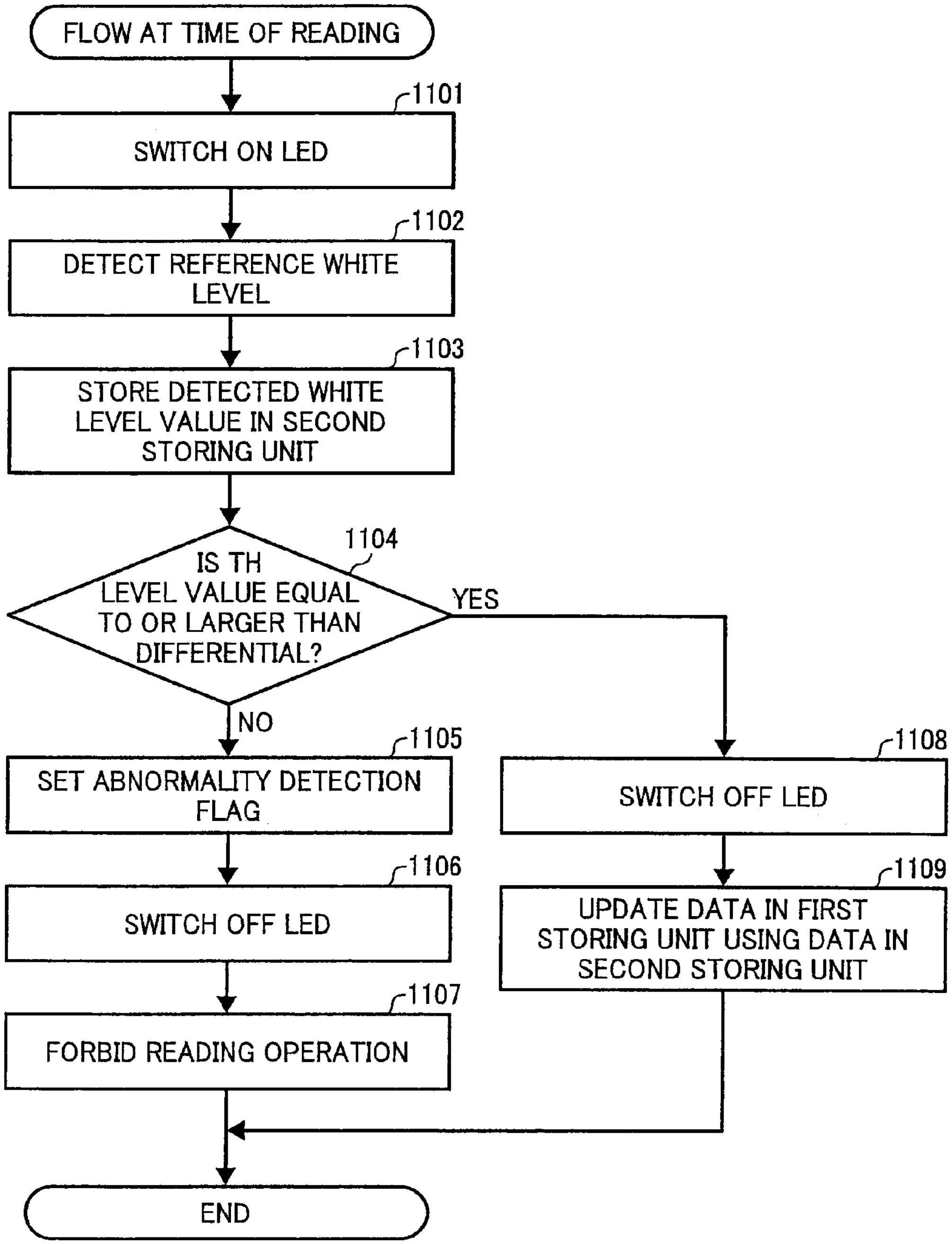
FIG. 11 is a flowchart for explaining the control operation of an image reading apparatus according to a third embodiment of the present invention.

FIG. 11 is a flowchart for explaining the control operation of an image reading apparatus of a third embodiment of the present invention. This flowchart will then be described. The circuit configuration of the image reading apparatus of FIG. 11 is the same as that of the image reading apparatus of FIG. 9. The process flow shown in FIG. 11 is carried out at the time of turning on the power supply. Control operation at the time of manuscript reading in the third embodiment may be the same as that in the first or second embodiment. The third embodiment is described on the assumption that, at the start of the process flow, the first storing unit 309 keeps a reference white level value stored therein before the previous power supply cutoff.

When the power supply is turned on, to detect light source abnormality, the LEDs are switched on, and the level of the reference white portion of the second reading roller 26 serving also as the reference white portion is detected to store the detected reference white level value in the second storing unit 308 (steps 1101 and 1103).

Then, a differential between the reference white level value stored before the previous power supply cut-off and still stored in the first storing unit 309 and the reference white level value stored in the second storing unit 308 at step 1103 is calculated. This differential is compared with the predetermined TH level value to determine on whether the TH level value exceeds the differential (step 1104).

When the differential exceeds the TH level value, that is, the differential is larger than the TH level value in the determination at step 1104, a determination is made that at least one of the LEDs serving as light sources has gone off or the light quantity of some of the lEDs has decreased significantly in a period between the previous power supply cutoff and turning on of the power supply this time. Following this determination, the abnormality detection flag is set and the LEDs are controlled to be switched off to forbid manuscript reading operation to follow (steps 1105 to 1107).

When the differential does not exceed the TH level value, that is, the differential is equal to or smaller than the TH level value in the determination at step 1104, a determination is made that the detected reference white level value is normal. Following this determination, the LEDs are controlled to be switched off, and the data stored in the second storing unit 308 is transferred to the first storing unit 309 to update the data in the first storing unit 309, which is followed by transition to the stand-by state (steps 1108 and 1109).

Figure 12:
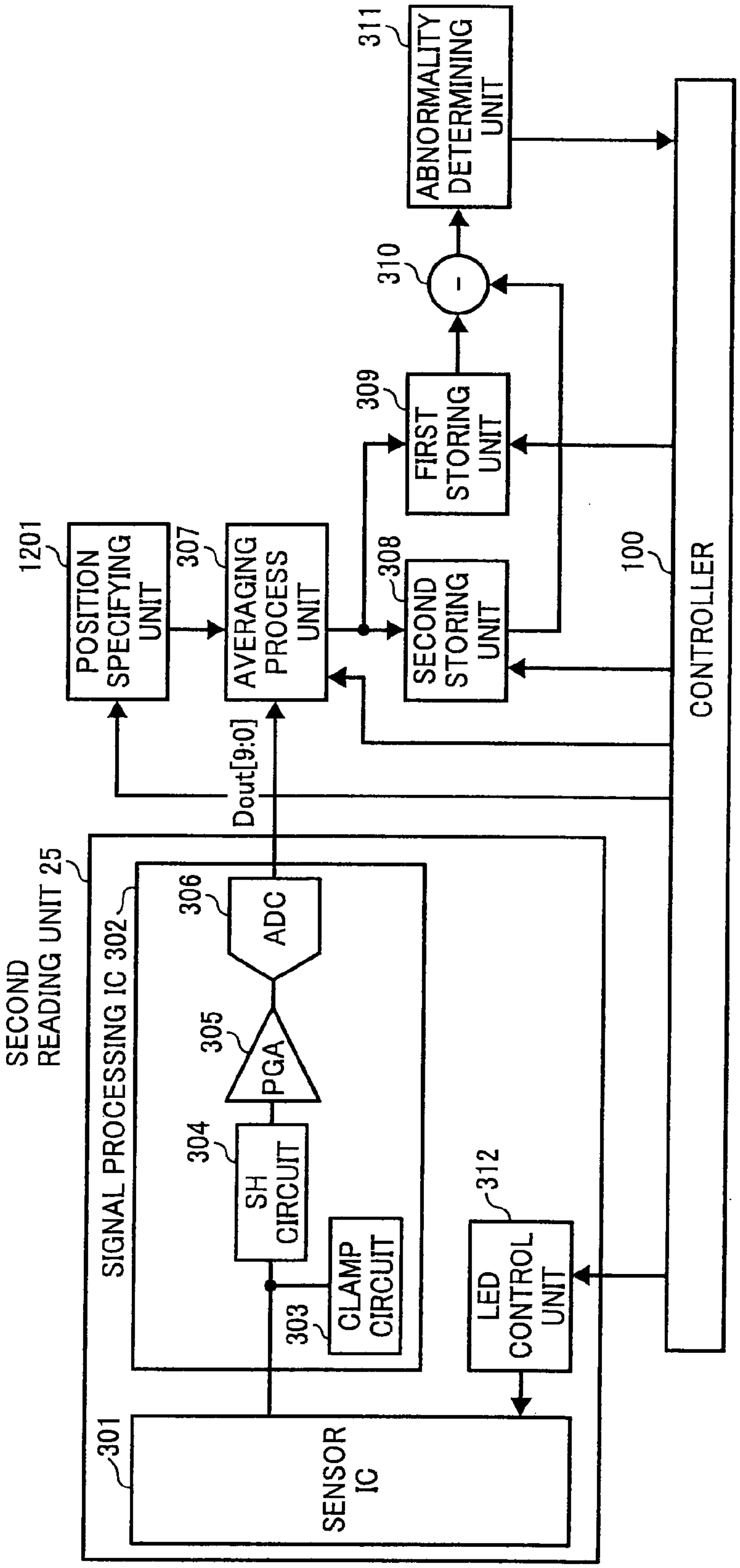
FIG. 12 is a block diagram of the circuit configuration of an image reading apparatus according to a fourth embodiment of the present invention.

FIG. 12 is a block diagram of the circuit configuration of an image reading apparatus of a fourth embodiment of the present invention. The image reading apparatus of FIG. 12 is basically the same in configuration as the image reading apparatus of the first embodiment shown in FIG. 3. The image reading apparatus of FIG. 12 is different from that of FIG. 3 in the point that the image reading apparatus of FIG. 12 is provided with a position specifying unit 1201 specifying a position of detection of the level of the reference white portion of the second reading roller 26, and that a position specify signal is given to the averaging process unit 307. In the forth embodiment, the controller 100 can control an average calculation position for the averaging process unit 307.

Figure 13:
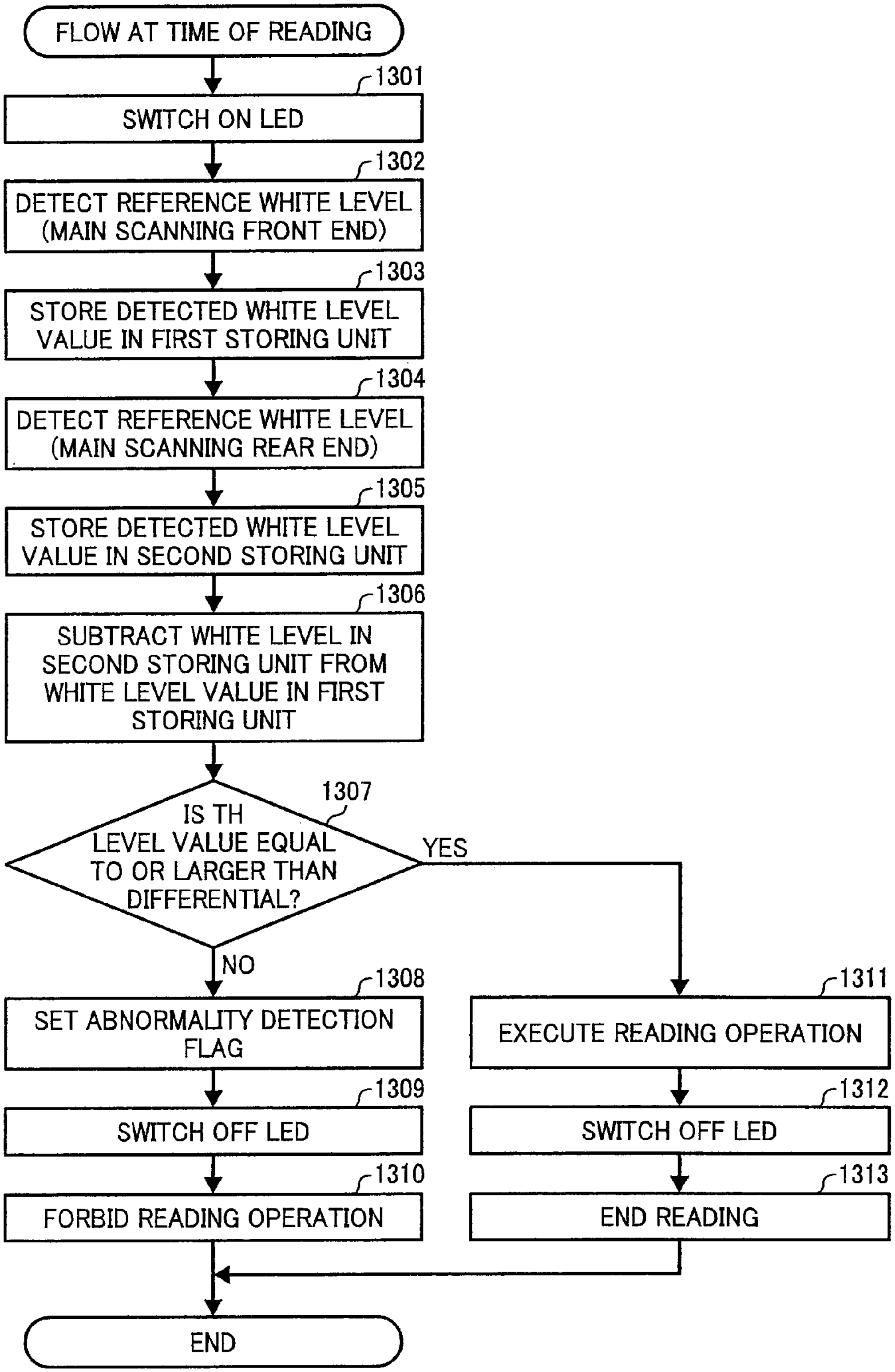
FIG. 13 is a flowchart for explaining the control operation of an image reading apparatus according to a fifth embodiment of the present invention.

FIG. 13 is a flowchart for explaining the control operation of an image reading apparatus of a fifth embodiment of the present invention. This flowchart will then be described. The circuit configuration of the image reading apparatus of FIG. 13 is the same as that of the image reading apparatus of FIG. 3. In the fifth embodiment, the position of detection of the level of reference white portion in the fourth embodiment shown in FIG. 12 is set on the main scanning front end and on the main scanning rear end. The process flow shown in FIG. 13 is carried out at the time of manuscript reading operation. In this embodiment, reference white levels that are different depending on places on the main scanning line are detected and compared to detect light source abnormality. The process flow at the time of turning on the power supply, therefore, is not necessary.

When manuscript reading operation is started, to detect light source abnormality before image reading operation, the LEDs are switched on, the level of the reference white portion of the second reading roller 26 serving also as the reference white portion is detected on a position on the main scanning front end, and the detected white level value is stored in the first storing unit 309 (steps 1301 and 1303).

Then, the level of the reference white portion of the second reading roller 26 serving also as the reference white portion is detected on a position on the main scanning rear end, and the detected white level value is stored in the second storing unit 308 (steps 1304 and 1305).

A differential between the reference white level value sored in the first storing unit 309 and the reference white level value stored in the second storing unit 308 is calculated. This differential is compared with the predetermined TH level value to determine on whether the TH level value exceeds the differential (steps 1306 and 1307).

When the differential exceeds the TH level value in the determination at step 1307, it means that light quantity differs significantly between the position on the main scanning front end and the position on the main scanning rear end. This leads to a determination that at least one of the LEDs on one side has gone off or the light quantity of the LEDs on one side has decreased significantly. Following this determination, the abnormality detection flag is set, and the LEDs are controlled to be switched off to forbid manuscript reading operation to follow (steps 1308 to 1310).

When the differential does not exceed the TH level value, that is, the differential is equal to or smaller than the TH level value in the determination at step 1307, a determination is made that the LEDs disposed on both end sides are normal. Following this determination, manuscript reading operation is executed, and then the LEDs are controlled to be switched off to end the process flow normally (steps 1311 and 1313).

In the fifth embodiment, two LEDs are disposed on each of both end sides to provide four LEDs in total, as described referring to FIG. 4A. In the process flow of the fifth embodiment, therefore, light source abnormality cannot be detected when each LED on both end sides does not go on. This, however, hardly poses a problem because the probability of simultaneous failing of two LEDs is extremely low. Besides, if manuscript reading operation is carried out in such a state, although a slight SN deterioration results, normal manuscript reading is ensured.

Figure 16A:
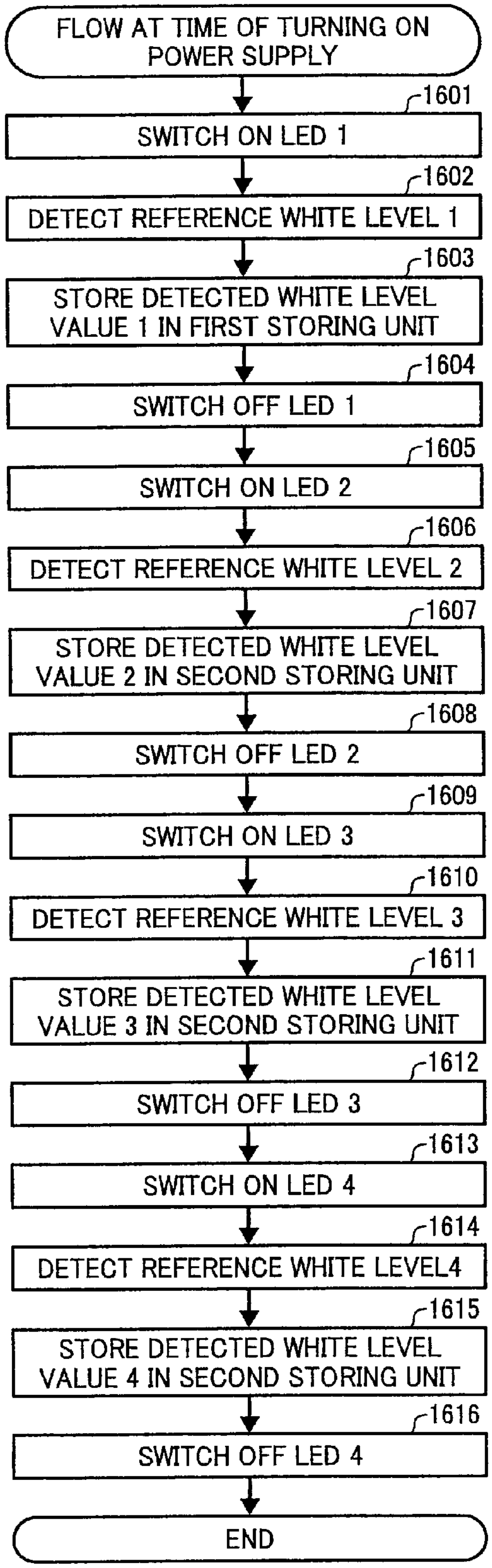
FIGS. 16A and 16B are flowcharts for explaining the control operation of an image reading apparatus according to a sixth embodiment of the present invention.
Figure 16B:
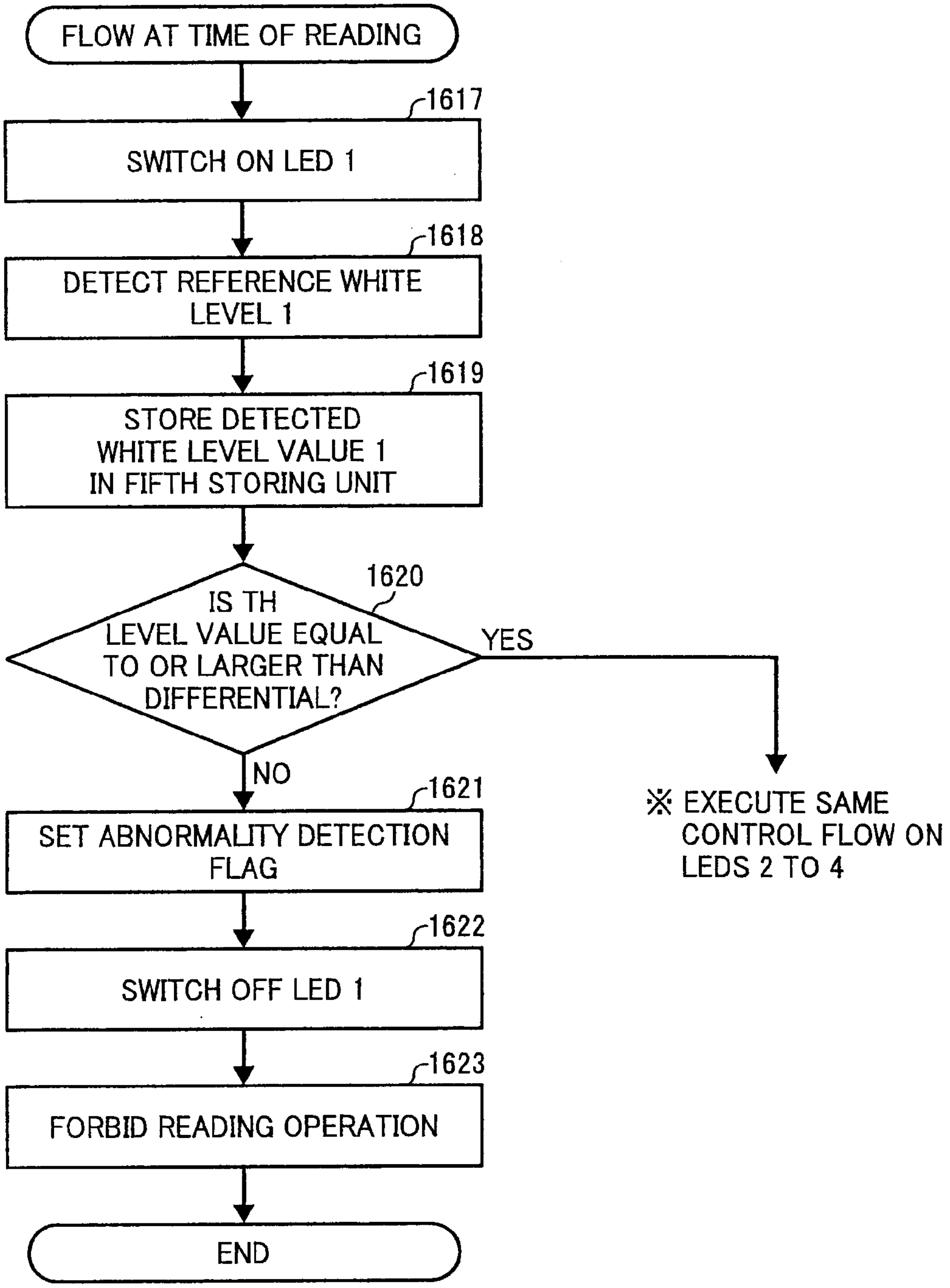
Figure 17:
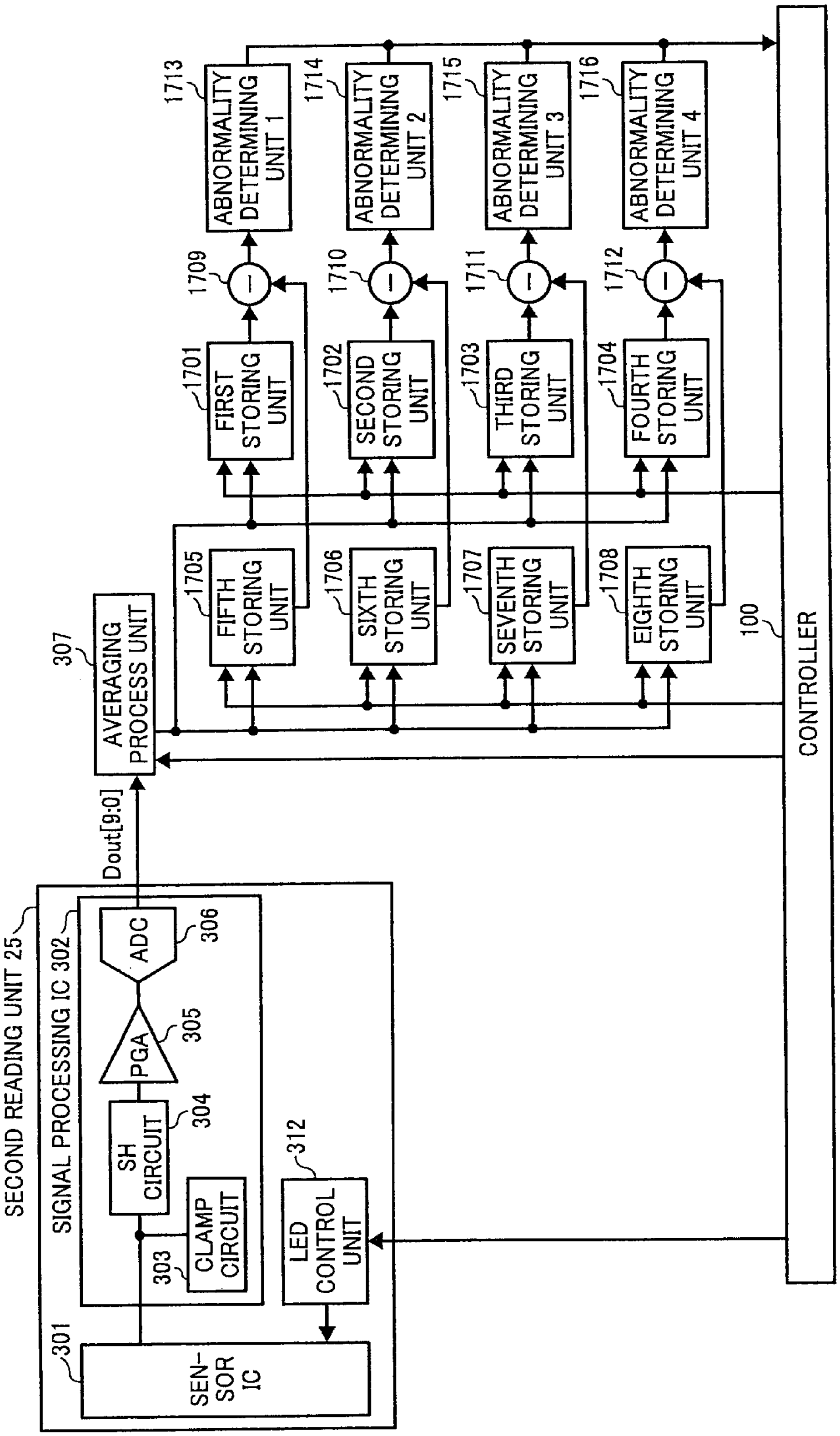
FIG. 17 is a block diagram of the circuit configuration of the image reading apparatus of the sixth embodiment.

FIGS. 16A and 16B are flowcharts for explaining the control operation of an image reading apparatus of a sixth embodiment of the present invention, and FIG. 17 is a block diagram of the circuit configuration of the image reading apparatus of the sixth embodiment.

The image reading apparatus of the sixth embodiment as shown in FIG. 17 has a configuration such that the image reading apparatus of FIG. 3 is provided with the first and second storing units storing detected white level values, differential detectors, and abnormality determining units in number equal to that of emitters. In the sixth embodiment, two LEDs are disposed on each of both end sides to provide four LEDs in total, as described referring to FIG. 4A. The image reading apparatus, therefore, has four light sources. In FIG. 17, first to forth storing units 1701 to 1704 correspond to the first storing unit 309 of the FIG. 3, and fifth to eighth storing units 1705 to 1708 correspond to the second storing unit 308 of the FIG. 3.

The operation of the sixth embodiment will then be described referring to the process flows shown FIGS. 16A and 16B. FIG. 16A depicts a process flow at the time of turning on the power supply, and FIG. 16B depicts a process flow at the time of manuscript reading, and both process flows as a whole will be described in succession. In these process flows, the abnormalities of four LEDs are detected one by one in any given order, and four LEDs are described as LEDs 1 to 4.

When the power supply of the image forming apparatus having the image reading apparatus is turned on, the LED 1 is controlled to be switched on first, and the level of the reference white portion of the second reading roller 26 serving also as the reference white portion is detected to obtain reference white data for abnormality detection. The obtained reference white level value is stored in the first storing unit 1701, and then the LED 1 is controlled to be switched off (steps 1601 to 1604).

Then, the LED 2 is controlled to be switched on, and the level of the reference white portion of the second reading roller 26 serving also as the reference white portion is detected to obtain reference white data for abnormality detection. The obtained reference white level value is stored in the second storing unit 1702, and then the LED 2 is controlled to be switched off (steps 1605 to 1608).

Then, the LED 3 is controlled to be switched on, and the level of the reference white portion of the second reading roller 26 serving also as the reference white portion is detected to obtain reference white data for abnormality detection. The obtained reference white level value is stored in the third storing unit 1703, and then the LED 3 is controlled to be switched off (steps 1609 to 1612).

Then, the LED 4 is controlled to be switched on, and the level of the reference white portion of the second reading roller 26 serving also as the reference white portion is detected to obtain reference white data for abnormality detection. The obtained reference white level value is stored in the third storing unit 1704, and then the LED 4 is controlled to be switched off, which is followed by transition to the stand-by state (steps 1613 to 1616).

Through the above processes steps 1601 to 1616, reference white level data for abnormality detection can be obtained for each LED. In the above description, every LED must be switched on. In this case, a detection process of detecting whether each LED actually goes on needs to be added as a step following a step of controlling each LED to switch on and obtaining the reference white level. This detection process is carried out by comparing the obtained data with a TH 2 level value predetermined and stored in a nonvolatile memory. If the LED cannot be switched on or light quantity decreases to a given extent or more, reading operation is forbidden.

When manuscript reading operation is started after the transition to the stand-by state following a determination of normal reference white level at the time of turning on the power supply, to detect the abnormality of each LED before image reading, the LED 1 is controlled to be switched on, and the level of the reference white portion of the second reading roller 26 serving also as the reference white portion is detected in the same process at the time of turning on the power supply. The detected level is stored as the comparison white level value in the fifth storing unit 1705 (steps 1617 to 1619).

Then, a differential between the reference white level value stored in the first storing unit 1701 at step 1603 and the comparison reference white level value stored in the fifth storing unit 1705 at step 1619 is calculated. This differential is compared with the predetermined TH level value to determine on whether the TH level value exceeds the differential (step 1620).

When the differential exceeds the TH level value in the determination at step 1620, a determination is made that the LED 1 has gone off or the light quantity has decreased. Following this determination, the abnormality detection flag is set, and the LED 1 is controlled to be switched off to forbid manuscript reading operation to follow (steps 1621 to 1623).

When the differential does not exceed the TH level value in the determination at step 1620, a determination is made that the detected comparison reference white level value is normal. Following this determination, the LED 1 is controlled to be switched off, and the LEDs 2 to 4 are checked for the presence/absence of abnormality in the same manner as the LED 1 is checked. Then, when the LEDs 1 to 4 are all normal, all of them are controlled to be switched on, and manuscript reading is carried out to end the process flow normally.

According to the embodiments of the present invention described above so far, image reading operation is stopped when a light source's, i.e., LED's being off or a light quantity decrease is detected as an abnormality. The present invention, however, enables separate adjustment of the light quantity of a light source showing abnormality based on an abnormality detection result. An embodiment of this case will then be described.

Figure 14:
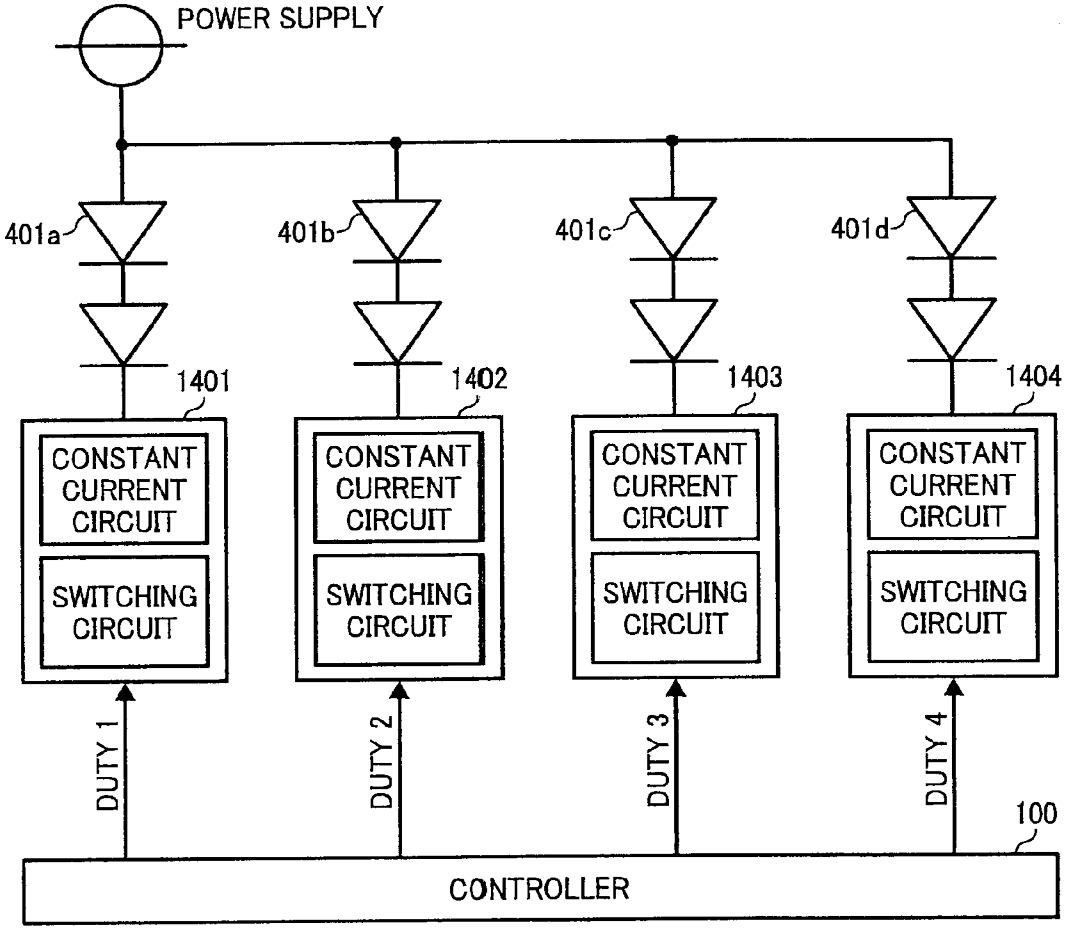
FIG. 14 is a block diagram of the configuration of an LED control unit that controls each of the LEDs on the LED circuit boards in operation according to a seventh embodiment of the present invention.
Figure 15:
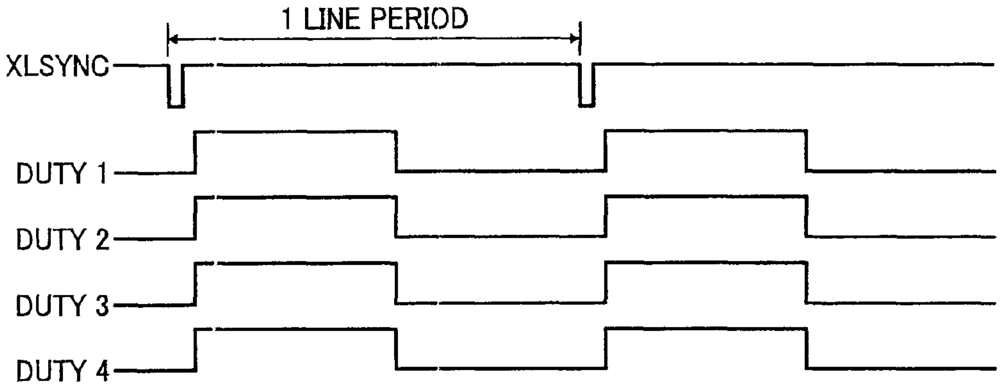
FIG. 15 depicts an example of timing of Duty signals for controlling the LEDs.

FIG. 14 is a block diagram of the configuration of the LED control unit 312 that controls each of the LEDs on the LED circuit boards 401*a* to 401*d* in operation according to a seventh embodiment of the present invention, and FIG. 15 depicts an example of timing of Duty signals 1 to 4 for controlling the LEDs. The circuit configuration of the image reading apparatus of FIG. 7 may be the same as that of FIG. 17, and includes four light sources.

As shown in FIG. 14, to control the light quantity of each of the LEDs on the LED circuit boards 401*a* to 401*d*, drive circuits 1401 to 1404 each having a constant current circuit and switching circuit are disposed between the LEDs and the controller 100, respectively. Duty signals 1 to 4, which are control signals from the controller 100, are applied to the drive circuits 1401 to 1404, respectively.

As shown in FIG. 15, the width of "H" period of each of the Duty signals 1 to 4 in 1 period of an XLSYNC signal, which is a line synchronization signal, is controlled by the controller 100. Each of the drive circuits 1401 to 1404 supplies a current to the LED on each of the LED circuit boards 401*a* to 401*d* during "H" period of each of the Duty signals 1 to 4 to cause each LED to emit light. "H" period of each of the Duty signals 1 to 4 can be controlled separately, which allows control of the light quantity of each LED.

Figure 18:
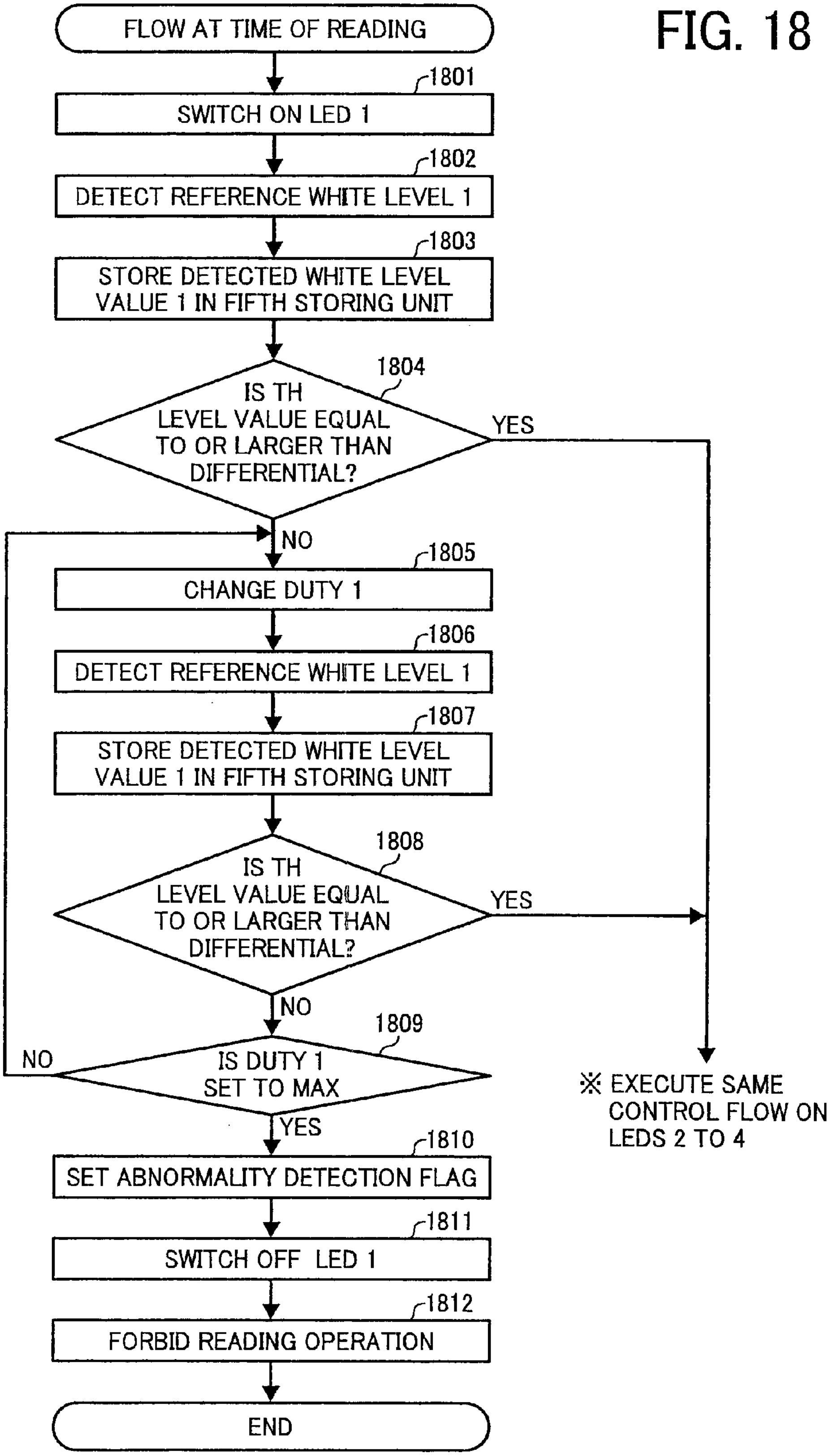
FIG. 18 is a flowchart for explaining the control operation of an image reading apparatus according to a seventh embodiment of the present invention.

FIG. 18 is a flowchart for explaining the control operation of an image reading apparatus of the seventh embodiment. This flowchart will then be described. The process flow shown in FIG. 18 is carried out before image reading at the time of manuscript reading. In the seventh embodiment, the process flow at the time of turning on the power supply is the same as that of FIG. 16A.

When manuscript reading operation is started after the transition to the stand-by state following a determination of normal reference white level at the time of turning on the power supply, to detect the abnormality of each ELD before image reading, the LED 1 is controlled to be switched on, and the level of the reference white portion of the second reading roller 26 serving also as the reference white portion is detected in the same process at the time of turning on the power supply. The detected level is stored as the comparison white level value in the fifth storing unit 1705 (steps 1801 to 1803).

Then, a differential between the reference white level value stored in the first storing unit 1701 in the process at the time of turning on the power supply and the comparison reference white level value stored in the fifth storing unit 1705 in the process at step 1619 is calculated. This differential is compared with the predetermined TH level value to determine on whether the TH level value exceeds the differential (step 1804).

When the differential exceeds the TH level value in the determination at step 1804, a determination is made that the light quantity of the LED 1 has decreased. Following this determination, "H" period of the Duty signal 1, which is an on-duty control signal for the LED on the LED circuit board 1, is changed to a period that is calculated from the differential. Then, the level of the reference white portion of the second reading roller 26 serving also as the reference white portion is detected again to store the detected level as the comparison white level value in the fifth storing unit 1705 (steps 1805 to 1807).

Then, a differential between the reference white level value stored in the first storing unit 1701 in the process at the time of turning on the power supply and the comparison reference white level value stored in the fifth storing unit 1705 at step 1619 is calculated. This differential is compared with the predetermined TH level value to determine on whether the TH level value exceeds the differential (step 1808).

When the differential exceeds the TH level value in the determination at step 1804, whether "H" period of the Duty signal 1 is set to the maximum is checked. When "H" period is not set to the maximum, the process flow returns to step 1805, from which the same processes are repeated (step 1809).

When "H" period of the Duty signal 1 is set to the maximum in the determination at step 1809, the abnormality detection flag is set, and the LED on the LED circuit board 1 is switched off to forbid reading operation to follow (steps 1810 to 1812).

When the differential does not exceed the TH level value in the determination at step 1804 or 1808, a determination is made that the detected comparison reference white level value is normal. Following this determination, the LED on the LED circuit board 1 is controlled to be switched off, and the LEDs on the LED circuit boards 2 to 4 are checked for the presence/absence of abnormality in the same manner as the LED on the circuit board LED 1 is checked. Then, when the LEDs on the circuit boards 1 to 4 are all normal, all of LEDs are controlled to be switched on, and manuscript reading operation is carried out to end the process flow normally.

The above seventh embodiment can be modified into an embodiment in which when one LED becomes off, control is made to increase the light quantity of an LED working on normally to compensate a light quantity decrease to prevent the formation of an abnormal image.

In the embodiments as described above, when the controller 100 receives an abnormal detection result from the abnormality determining unit 311, the controller 100 may display the detection result on a display (not shown) of the operation unit 108 of the image forming apparatus, and may also carry out control so as to stop only the color image reading while allowing monochrome image reading when an abnormality occurs.

The process of the embodiments is carried out using programs that are executed by the controller of the present invention. The programs can be provided as programs stored on recording mediums, such as FD, CD-ROM, and DVD, or provided in the form of digital data via a network.

According to the embodiment of the present invention, a light source's being off or a light quantity decrease in an image reading apparatus having a plurality of light sources can be detected precisely to forbid reading operation. This prevents the formation of an abnormal image.

Usually, a comparing unit comparing reference white data levels does not have reference data for comparison when the power supply is turned on, so that abnormality detection cannot be carried out at the time of turning on the power supply. The embodiment of the present invention, however, allows the use of a reference white portion level held at the previous power supply cutoff. Light source abnormality, therefore, can be detected using preferably designed reference data even when the power supply is turned on.

Usually, the light quantity of an LED changes depending on time passage or temperature change, and the output level of the reading apparatus changes in response to this light quantity change. According to the embodiment of the present invention, however, a comparison threshold level range can be narrowed by determining the previous reference white reading level to be the next comparison data. This enables further improvement in detection precision.

Putting the reading apparatus in service for a long time causes a drop in the output level of the reading apparatus to a level lower than a designed level, which brings a need of widening the comparison threshold level range. In the embodiment of the present invention, however, the final reference white level obtained at power supply cutoff can be used for determining the abnormality of the reference white data level at the time of turning on the power supply. The comparison threshold level range, therefore, can be narrowed to improve detection precision.

According to the embodiment of the present invention, an emitter's being off can be detected precisely even when one of a plurality of emitters goes off.

The embodiment of the present invention eliminates a need of obtaining beforehand reference data to be compared for abnormality detection. This allows detection of light source abnormality in a simple configuration without requiring a nonvolatile memory.

According to the embodiment of the present invention, reference data for separately comparing a plurality of light sources for abnormality detection can be prepared. With the prepared reference data, the plurality of light sources are switched on sequentially and are separately compared to detect an abnormality. This enables further improvement in detection precision and in identification of a light source being off.

According to the embodiment of the present invention, a light source being off is identified, and the light quantity of a light source located to be capable of compensating a light quantity decrease due to the light source being off is adjusted. This allows normal image reading even when an abnormality occurs.

According to the embodiment of the present invention, a detection result of abnormal detection is displayed on an operation unit to inform a user of the contents of abnormality. In addition, the effect of downtime is reduced by allowing operation in a monochrome mode, which is less affected even if light quantity drops, while suspending operation in a color mode.

According to the present invention, an abnormality due to a light source's being off or a light quantity decrease can be detected precisely in an image reading apparatus having a plurality of light sources.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus having a light source emitting light on a manuscript, a photoelectric conversion element detecting refection light from the manuscript to obtain an analog image signal, and a signal processing unit digitizing the analog image signal to output a digitized image signal, the image reading apparatus comprising:

a plurality of LEDs as the light source disposed on both end sides in a main scanning direction that is a width direction of the manuscript;

a light guide configured to synthesize incident light from the plurality of LEDs to emit the synthesized light as a band-shaped light flux onto the manuscript;

a detecting unit configured to detect a white data level at a time of a manuscript reading operation at each position near the light source that is on the front end side and the rear end side in the main scanning direction; and an abnormality detecting unit configured to calculate a differential between two detected white data levels to detect abnormality of the light source from the differential, the two detected white data levels include a front reference white data level detected at the front end side in the main scanning direction, and a rear reference white data level detected at the rear end side in the main scanning direction.

2. The image reading apparatus according to claim 1, wherein manuscript reading operation is forbidden when the abnormality detecting unit detects abnormality of the light source.

3. The image reading apparatus according to claim 1, wherein reading of a monochrome image is allowed and reading of a color image is stopped when the abnormality detecting unit detects abnormality of the light source.

4. The image reading apparatus according to claim 1, further comprising a displaying unit configured to display a result of detection of light source abnormality by the abnormality detecting unit on an operation unit.

5. An image forming apparatus comprising:

an image reading apparatus having a light source emitting light on a manuscript, a photoelectric conversion element detecting refection light from the manuscript to obtain an analog image signal, and a signal processing unit digitizing the analog image signal to output a digitized image signal, the image reading apparatus including a plurality of LEDs as the light source disposed on both end sides in a main scanning direction that is a width direction of the manuscript, a light guide configured to synthesize incident light from the plurality of LEDs to emit the synthesized light as a band-shaped light flux onto the manuscript, a detecting unit configured to detect a white data level at a time of a manuscript reading operation at each position near the light source that is on the front end side and the rear end side in the main scanning direction, and an abnormality detecting unit configured to calculate a differential between two detected white data levels to detect abnormality of the light source from the differential, the two detected white data levels include a front reference white data level detected at the front end side in the main scanning direction, and a rear reference white data level detected at the rear end side in the main scanning direction.

* * * * *